(12) United States Patent
Goffe

(10) Patent No.: US 9,737,877 B2
(45) Date of Patent: Aug. 22, 2017

(54) SURFACE-MODIFIED CATALYST PRECURSORS FOR DIESEL ENGINE AFTERTREATMENT APPLICATIONS

(71) Applicant: Randal A. Goffe, Everett, WA (US)

(72) Inventor: Randal A. Goffe, Everett, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/934,955

(22) Filed: Nov. 6, 2015

(65) Prior Publication Data
US 2017/0128913 A1    May 11, 2017

(51) Int. Cl.
| | | |
|---|---|---|
| *B01J 23/20* | (2006.01) | |
| *B01J 23/10* | (2006.01) | |
| *B01J 29/46* | (2006.01) | |
| *B01J 29/85* | (2006.01) | |
| *B01J 37/08* | (2006.01) | |
| *B01J 37/02* | (2006.01) | |

(52) U.S. Cl.
CPC ............. *B01J 23/20* (2013.01); *B01J 23/10* (2013.01); *B01J 29/46* (2013.01); *B01J 29/85* (2013.01); *B01J 37/0219* (2013.01); *B01J 37/086* (2013.01)

(58) Field of Classification Search
None
See application file for complete search history.

(56) References Cited

U.S. PATENT DOCUMENTS

| | | | |
|---|---|---|---|
| 4,711,871 A | * | 12/1987 | Wachs ............... B01J 23/648 502/325 |
| 7,229,597 B2 | | 6/2007 | Patchett et al. |
| 7,902,107 B2 | | 3/2011 | Patchett et al. |
| 7,998,423 B2 | | 8/2011 | Boorse et al. |
| 8,119,088 B2 | | 2/2012 | Boorse et al. |
| 8,501,132 B2 | * | 8/2013 | Fu ..................... B82Y 30/00 423/239.1 |

(Continued)

OTHER PUBLICATIONS

Conway, R., et al., "Demonstration of SCR on a Diesel Particulate Filter System on a Heavy Duty Application," SAE Technical Paper 2015-01-1033, Apr. 14, 2015, Abstract.

(Continued)

*Primary Examiner* — Melvin C Mayes
*Assistant Examiner* — Stefanie Cohen
(74) *Attorney, Agent, or Firm* — Christensen O'Connor Johnson Kindness PLLC

(57) ABSTRACT

The present disclosure features a method of making an engine aftertreatment catalyst, where the engine aftertreatment catalyst includes a metal oxide, a metal zeolite, and/or vanadium oxide when the metal oxide is different from vanadium oxide, each of which can be independently surface-modified with a surface modifier. The method includes providing a solution including an organic solvent and an organometallic compound; mixing the solution with a metal oxide, a metal zeolite, and/or a vanadium oxide to provide a mixture; drying the mixture; and calcining the mixture to provide a surface-modified metal oxide catalyst, a surface-modified metal zeolite catalyst, and/or a surface-modified vanadium oxide catalyst. The organometallic compound can be, for example, a metal alkoxide, a metal carboxylate, a metal acetylacetonate, and/or a metal organic acid ester.

28 Claims, 21 Drawing Sheets

(56) References Cited

U.S. PATENT DOCUMENTS

| | | |
|---|---|---|
| 2010/0180580 A1 | 7/2010 | Boorse et al. |
| 2015/0209766 A1* | 7/2015 | Xavier .................... B01J 21/04 502/220 |

OTHER PUBLICATIONS

Devarakonda, M.N., et al., "Technical Challenges in the Integration of DPF and SCR Aftertreatment—Review From a Systems and Modeling Perspective," 12th DOE Cross-Cut Workshop on Lean Exhaust Emissions Reduction Simulations [CLEERS], Apr. 28-30, 2009, Dearborn, Mich., Abstract, 1 page.

Devarakonda, M.N., et al., "Technical Challenges in the Integration of DPF and SCR Aftertreatment on a Single Substrate—Review From a Systems and Modeling Perspective," presented by Maruthi N. Devarakonda at 12th DOE Cross-Cut Workshop on Lean Exhaust Emissions Reduction Simulations [CLEERS], Apr. 28-30, 2009, Dearborn, Mich., Apr. 29, 2009, 22 pages.

"Engine Aftertreatment Systems: Operator's Manual," No. Y53-1090C, PACCAR Inc, Bellevue, Wash., 2011, 42 pages.

Geisselmann, A., "Future Aftertreatment Concepts for Heavy Duty Application," Abstract in SAE 2014 Heavy Duty Diesel Emissions Control Symposium, Event Guide, Gothenburg, Sweden, Sep. 17-18, 2014, p. 25.

Goffe, R.A., and D.M. Mason, "Electrocatalytic Oxidation of Hydrocarbons on a Stabilized-Zirconia Electrolyte Employing Gold or Platinum Electrodes," Journal of Applied Electrochemistry 11(4):447-452, Jul. 1981.

Kwak, J.H., et al., "Effects of Hydrothermal Aging on $NH_3$-SCR Reaction Over Cu/Zeolites," Journal of Catalysis 287(1):203-209, Mar. 2012.

Kwak, J.H., et al., "Excellent Activity and Selectivity of Cu-SSZ-13 in the Selective Catalytic Reduction of NO(x) and $NH_3$," Journal of Catalysis 275(2):187-190, Oct. 2010.

Rappé, K.G., "Combination and Integration of DPF-SCR Aftertreatment Technologies," presented by Kenneth G. Rappé at Annual Merit Review and Peer Evaluation, May 16, 2012, 24 pages.

Rappé, K.G., and G.D. Maupin, "III.6 Integration of DPF & SCR Technologies for Combined Soot and NO(x) After-Treatment," Advanced Combustion Engine R&D, FY 2014 Annual Report, Pacific Northwest National Laboratory, Richland, Wash., pp. III-30-III-33.

Rappé, K.G., et al., "Combination & Integration of DPF-SCR Aftertreatment," presented by Kenneth G. Rappé at Directions in Engine-Efficiency and Emissions Research Conference [DEER 2011], Detroit, Mich., Oct. 5, 2011, 18 pages.

Rappé, K.G., et al., "Combination & Integration of DPF-SCR Aftertreatment," presented by Kenneth G. Rappé at Directions in Engine-Efficiency and Emissions Research Conference [DEER 2012], Dearborn, Mich., Oct. 18, 2012, 34 pages.

Rappé, K.G., et al., "Combination and Integration of DPF-SCR Aftertreatment Technologies," presented by Darrell R. Herling at the DOE Annual Merit Review and Peer Evaluation, Arlington, Va., May 11, 2011, 24 pages.

Rappé, K.G., et al., "Combination and Integration of DPF-SCR Aftertreatment Technologies," presented by Darrell R. Herling at the DOE Annual Merit Review and Peer Evaluation, Washington, D.C., Jun. 9, 2010, 16 pages.

Rappé, K.G., et al., "II.B.12 Combination and Integration of DPF-SCR After-Treatment," Advanced Combustion Engine R&D, FY 2011 Annual Report, Pacific Northwest National Laboratory, Richland, Wash., pp. 227-230.

Storey, J.M.E., et al., "Characterization of Urea Decomposition Products in Selective Catalytic Reduction Catalyst Systems," Abstracts of Papers of the American Chemical Society, Washington, D.C., 2011, vol. 242, 2 pages.

Ye, Q., et al., "Activity, Propene Poisoning Resistance and Hydrothermal Stability of Copper Exchanged Chabazite-Like Zeolite Catalysts for SCR of NO With Ammonia in Comparison to Cu/ZSM-5," Applied Catalysis A: General 427-428:24-34, Jun. 2012.

* cited by examiner

SAPO-34 / Nb₂O₅ - LOW MAGNIFICATION

| ELEMENT | Wt% | At% |
|---|---|---|
| CK | 24.31 | 36.16 |
| OK | 39.54 | 44.15 |
| AlK | 13.87 | 09.18 |
| SiK | 04.55 | 02.89 |
| PK | 10.94 | 06.31 |
| NbL | 06.79 | 01.31 |
| MATRIX | CORRECTION | ZAF |

SAPO-34 / Nb$_2$O$_5$ - HIGH MAGNIFICATION

| ELEMENT | Wt% | At% |
|---|---|---|
| CK | 07.04 | 14.70 |
| OK | 38.28 | 60.02 |
| AlK | 08.51 | 07.91 |
| SiK | 02.67 | 02.39 |
| PK | 05.99 | 04.85 |
| NbL | 37.52 | 10.13 |
| MATRIX | CORRECTION | ZAF |

SAPO-34 / Nb$_2$O$_5$ - HIGH MAGNIFICATION

| ELEMENT | Wt% | At% |
|---|---|---|
| CK | 14.21 | 24.89 |
| OK | 28.79 | 37.84 |
| AlK | 20.91 | 16.30 |
| SiK | 07.58 | 05.67 |
| PK | 19.53 | 13.26 |
| NbL | 08.98 | 02.03 |
| MATRIX | CORRECTION | ZAF |

| Catalyst # | Composition | % HMAr | Peak NH₃ Release (°C) | Intensity of NH₃ Release | | | | | | | | |
|---|---|---|---|---|---|---|---|---|---|---|---|---|
| | | | | 150°C | 200°C | 250°C | 300°C | 350°C | 400°C | 450°C | 500°C | 550°C |
| A | YSZ-8 | (13.7*) | 234 | 0.05 | 0.3 | 0.015 | | 0.001 | | 0.02 | | |
| B | YSZ-8 / Nb [Pentanol, 200°C] | 16 | 223 | 0.0005 | 0.2 | | | 0.005 | | | | |
| C | TiO₂ | (22.4*) | 255 | 0.04 | not available | 0.3 | | | | | | |
| D | YSZ-8 / Ti [Pentanol, 200°C] | 19 | 249 | 0.005 | 0.2 | | | | | | | |
| E | ZrO₂ / Nb [Pentanol, 200°C] | 14 | (150-300°C) | 0.1 | not available | 0.4 | | | | | | |
| F | ZrO₂ | (32.5*) | 218 | 0.04 | 0.2 | 0.015 | 0.01 | 0.001 | | | 0.025 | |
| 50% Urea | Not Applicable | (39.5*) | (Initial: 170°C) | <0.0001 | 0.025 | <0.0001 | | 0.01 | 0.02 | | 0.02 | |

Intensity of NH₃ Release: Low | Medium | High

Note: (*) – Data reported previously[2]

Note: HMAr = High molecular weight aromatics, determined via TGA

*FIG. 8A*

| Catalyst # | Composition | % HMAr | Peak H₂O Release (°C) | 150°C | 200°C | 250°C | 300°C | 350°C | 400°C | 450°C | 500°C | 550°C |
|---|---|---|---|---|---|---|---|---|---|---|---|---|
| A | YSZ-8 | (13.7*) | n/a | 0.02 | 0.001 | 0.03 | | 0.03 | | 0.03 | | |
| B | YSZ-8 / Nb [Pentanol, 200°C] | 16 | (150-200°C) | 0.02 | 0 | 0.001 | | 0.001 | | | | |
| C | TiO₂ | (22.4*) | (≤ 150°C) | not available | not available | 0 | 0 | | | | | |
| D | YSZ-8 / Ti [Pentanol, 200°C] | 19 | n/a | 0.02 | 0.02 | not available | not available | 0.02 | | | | |
| E | ZrO₂ / Nb [Pentanol, 200°C] | 14 | (~ 150°C) | 0.01 | not available | 0 | not available | 0 | | | | |
| F | ZrO₂ | (32.5*) | n/a | 0.02 | 0.02 | 0.03 | 0.02 | 0.02 | | | 0.02 | |
| 50% Urea | Not Applicable | (39.5*) | n/a | 0.02 | 0.02 | 0.03 | not available | 0.02 | 0.02 | not available | 0.02 | |

Note: (*) – Data reported previously²

Intensity of H₂O Release: Low | Medium | High

Note: HMAr = High molecular weight aromatics, determined via TGA

*FIG. 8B*

SURFACE-MODIFIED CATALYST PRECURSORS FOR DIESEL ENGINE AFTERTREATMENT APPLICATIONS

BACKGROUND

Internal combustion engine exhaust emissions, and especially diesel engine exhaust emissions, have recently come under scrutiny with the advent of stricter regulations, both in the U.S. and abroad. While diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("NOx"), and sulfur oxides ("SOx"). Aftertreatment systems may be utilized to reduce or eliminate emissions of these and other combustion products.

A number of catalysts are used to reduce emissions in diesel aftertreatment systems. FIG. 1A shows a block diagram providing a brief overview of a vehicle powertrain. The components include an internal combustion engine 20 in flow communication with one or more selected components of an exhaust aftertreatment system 24. The exhaust aftertreatment system 24 optionally includes a catalyst system 96 upstream of a particulate filter 100. In the embodiment shown, the catalyst system 96 is a diesel oxidation catalyst (DOC) 96 coupled in flow communication to receive and treat exhaust from the engine 20. The DOC 96 is preferably a flow-through device that includes either a honeycomb-like or plate-like substrate. The substrate has a surface area that includes (e.g., is coated with) a catalyst. The catalyst can be an oxidation catalyst, which can include a precious metal catalyst, such as platinum or palladium, for rapid conversion of hydrocarbons, carbon monoxide, and nitric oxides in the engine exhaust gas into carbon dioxide, nitrogen, water, or $NO_2$.

Once the exhaust has flowed through DOC 96, the DPF 100 is utilized to capture unwanted diesel particulate matter from the flow of exhaust gas exiting engine 20, by flowing exhaust across the walls of DPF channels. The diesel particulate matter includes sub-micron sized solid and liquid particles found in diesel exhaust. The DPF 100 can be manufactured from a variety of materials including but not limited to cordierite, silicon carbide, and/or other high temperature oxide ceramics.

The treated exhaust gases can then proceed through diesel exhaust fluid doser 102 for the introduction of a reductant, such as ammonia or a urea solution. The exhaust gases then flow to a selective catalytic reduction (SCR) system 104, which can include a catalytic core having a selective catalytic reduction catalyst (SCR catalyst) loaded thereon.

System 24 can include one or more sensors (not illustrated) associated with components of the system 24, such as one or more temperature sensors, NOx sensor, oxygen sensor, mass flow sensor, and a pressure sensor.

As discussed above, the exhaust aftertreatment system 24 includes a Selective Catalytic Reduction (SCR) system 104. The SCR system 104 includes a selective catalytic reduction catalyst which interacts with NOx gases to convert the NOx gases into $N_2$ and water, in the presence of an ammonia reductant. The overall reactions of NOx reductions in an SCR are shown below.

$$4NO+4NH_3+O_2 \rightarrow 4N_2+6H_2O \tag{1}$$

$$6NO_2+8NH_3 \rightarrow 7N_2+12H_2O \tag{2}$$

$$2NH_3+NO+NO_2 \rightarrow 2N_2+3H_2O \tag{3}$$

Where Equation (1) represents a standard SCR reaction and Equation (3) represents a fast SCR reaction.

There is a need for easy tailoring and screening of the various catalysts that are present in an engine aftertreatment system. For example, there is a need for a high durability SCR catalyst that is able to withstand the harsh environments resulting from high intensity diesel exhaust fluid dosing, and for easy synthesis of the catalyst. The present disclosure seeks to fulfill these needs and provides further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features a method of making an engine aftertreatment catalyst, including providing a solution comprising an organic solvent and an organometallic compound selected from a metal alkoxide, a metal carboxylate, a metal acetylacetonate, a metal organic acid ester, and a combination thereof; mixing the solution with a metal oxide, a metal zeolite, or both a metal oxide and a metal zeolite to provide a mixture; drying the mixture; and calcining the mixture to provide a surface-modified metal oxide catalyst.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8A is a table showing urea hydrolysis catalyst evaluation by TGA/FTIR analysis and shows the intensity of water release.

FIG. 8B is a table showing urea hydrolysis catalyst evaluation by TGA/FTIR analysis and shows the intensity of ammonia release.

DETAILED DESCRIPTION

Figure 1A:
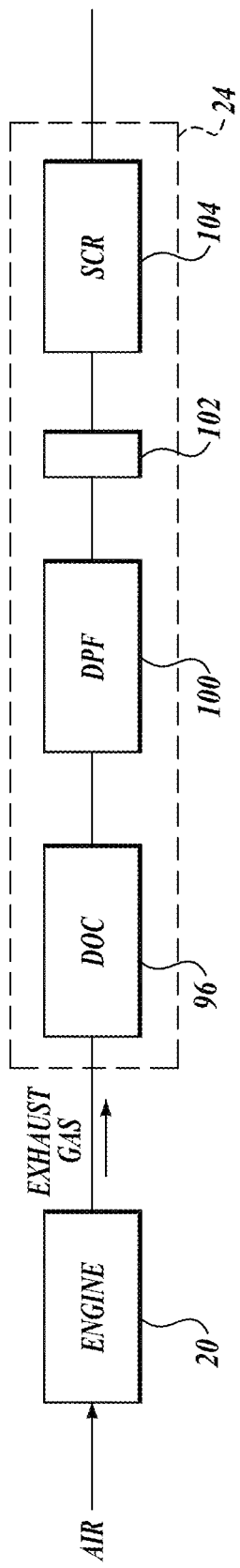
FIG. 1A is a block diagram of an example of an aftertreatment system coupled to an internal combustion engine.

The present disclosure features a method of making an engine aftertreatment catalyst, where the engine aftertreatment catalyst includes a metal oxide, a metal zeolite, and/or vanadium oxide when the metal oxide is different from vanadium oxide, each of which can be independently surface-modified with a surface modifier. The method includes providing a solution including an organic solvent and an organometallic compound; mixing the solution with a metal oxide, a metal zeolite, and/or a vanadium oxide to provide a mixture; drying the mixture; and calcining the mixture to provide a surface-modified metal oxide catalyst, a surface-modified metal zeolite catalyst, and/or a surface-modified vanadium oxide catalyst. The organometallic compound can be, for example, a metal alkoxide, a metal carboxylate, a metal acetylacetonate, and/or a metal organic acid ester.

In some embodiments, the metal oxide, the metal zeolite, and/or the vanadium oxide is surface-modified with one or more metal elements, such as Nb, Ca, Sc, Ta, Ti, V, Cr, Mn, Mo, Al, Si, Ge, Ir, Os, Fe, Co, Ni, Cu, Y, Zr, Ru, Rh, Pd, Pt, Ag, Ba, W, La, Re, and/or Ce, each of which can be independently positively charged and/or uncharged. As used herein, "metal elements" include both uncharged metal elements and metal cations. The one or more metal elements can form an intimate layer with an underlying metal oxide or zeolite surface. In some embodiments, the one or more metal elements are covalently bonded to the underlying metal oxide surface or the underlying zeolite surface, where the one or more metal elements can occupy a location in the crystal lattice of the metal oxide or zeolite in the form of a metal ion surrounded by the requisite number of oxide counter ions to achieve overall electrical neutrality.

In some embodiments, the method further includes exposing the surface-modified metal oxide catalyst, the surface-modified metal zeolite catalyst, and/or the surface-modified vanadium oxide catalyst to a solution including metal salts, such as a solution including nickel ions and/or copper ions. The method can further include calcining the surface-modified metal oxide catalyst, the surface-modified metal zeolite catalyst, and/or the surface-modified vanadium oxide catalyst after exposing the surface-modified metal oxide catalyst, the surface-modified metal zeolite catalyst, and/or the surface-modified vanadium oxide catalyst to a solution including metal salts (e.g., nickel ions, copper ions).

In some embodiments, mixing the solution with a metal oxide, a metal zeolite, and/or a vanadium oxide is done by milling and/or stirring, so long as the mixing provides a homogeneous mixture, i.e., with minimal aggregation and/or clumping of the mixture.

In some embodiments, drying the mixture is done by air drying, and/or by heating at a temperature of from 20° C. (e.g., from 40° C., from 60° C., from 80° C., or from 100° C.) to 110° C. (e.g., to 100° C., to 80° C., to 60° C., or to 40° C.) to remove residual solvent in the mixture.

In some embodiments, calcining includes heating the mixture to a temperature of from 450° C. (e.g., from 475° C., from 500° C., from 525° C.) to 550° C. (e.g., to 525° C., to 500° C., to 475° C.) for a duration of from 0.5 to 5 hours (e.g., from 1 to 5 hours, from 2 to 5 hours, from 3 to 5 hours, from 4 to 5 hours, from 1 to 2 hours, from 1.5 to 2 hours, from 2 to 3 hours). Calcining the mixture removes organic materials from the mixture, such as from the organometallic compounds and/or the organic solvents. When performed in the presence of oxygen, calcining can form metal oxides from the organometallic compounds and/or can cause the organometallic compounds to react with a substrate, such as a metal oxide (e.g., a vanadium oxide) and/or a metal zeolite, by forming covalent bonds between the metal in the organometallic compounds and the substrate.

Without wishing to be bound by theory, it is believed that surface modification of a suitable substrate material (e.g., a substrate such as a metal oxide, and/or a metal zeolite) enables the easy synthesis of catalysts with desired properties. In some embodiments, the surface-modified substrate material may then be incorporated into washcoat formulations and applied to suitable supports (e.g., cordierite, silicon carbide, metallic supports, etc.).

Reagents

As discussed above, the method can include providing a solution including an organic solvent and an organometallic compound.

In some embodiments, the organometallic compound used for modifying a surface of a given substrate material (e.g., a metal oxide or a metal zeolite) is insoluble in water, sparingly soluble, or readily decomposes in water, but is soluble in organic solvents including alcohols (e.g., propanol, isopropanol, pentanol, butanol, octanol, decanol, etc.), ethers (e.g., diethyl ether, ethyl propyl ether, dipropyl ether, butyl propyl ether, pentyl propyl ether, etc.), and esters (e.g., ethyl acetate, methyl methanoate, propyl propanoate, ethyl propanoate, ethyl benzoate, etc.). Without wishing to be bound by theory, it is believed that a solvent having an optimal process temperature can allow the amalgamation of the surface modifier into the lattice structure of the upper atomic layers of substrate material, and/or achieve a coating of the surface modifier on the substrate material.

The surface modifier and the solvent can have the following characteristics:

1. The surface modifier can be an organometallic compound that is sparingly soluble in water, totally insoluble in water, or that decomposes in water. As used herein, sparingly soluble refers to a solubility of less than 1 g/L at 20° C.

2. The solvent can be capable of solubilizing organometallic compounds that exhibit polar properties or properties of ionic coordination complexes.

3. Water can serve as a non-solvent to aid in controlling the surface modification process. The water can be in any phase, such as adsorbed, vapor, or liquid. In some embodiments, the water is present in an amount sufficient to solubilize water soluble components in an aqueous-based washcoat composition and attain the desired rheology. The surface modifiers (e.g., surface modifying metals) can be readily formed from organometallic compounds. The organometallic compounds can react with water to precipitate the surface modifiers on a surface of a washcoat precursor material. In some embodiments, the organometallic compounds are soluble in organic solvents such as alcohols and ethers and the like, which are also miscible with water.

As an example, the organometallic compounds can be metal alkoxides; metal carboxylates, metal acetyl acetonates, and/or metal organic esters. Examples of metal alkoxides include metal ethoxides (e.g., titanium(IV) ethoxide; $Ti(OC_2H_5)_4$), metal propoxides (e.g., titanium(IV) isopropoxide; $Ti[OCH(CH_3)_2]_4$); metal butoxides (e.g., titanium(IV) butoxide $(Ti(OCH_2CH_2CH_2CH_3)_4)$, barium tert-butoxide $(C_8H_{18}BaO_2)$, etc.); metal pentoxides, methoxyethoxides such as yttrium 2-methoxyethoxide; $Y(OEtOMe)_3$), niobium (III) chloride 1,2-dimethoxyethane complex; $NbCl_3 \cdot CH_3OCH_2CH_2OCH_3$, niobium ethoxide, polynuclear and heterometallic alkoxides such as $Re_4O_{6-y}(OCH_3)_{12+y}$, $Re_{4-x}Mo_xO_{6-y}(OCH_3)_{12+y}$, $Re_{4-x}W_xO_{6-y}(OCH_3)_{12+y}$, titanium isopropoxide, titanium ethoxide, zirconium ethoxide, tetraethyl orthosilicate, aluminium isopropoxide, niobium ethoxide, tantalum ethoxide, potassium tert-butoxide, $[CrAl(OPr^i)_4]_3$, $Mn[Al(OPr^i)_4]_2$, $[Fe\{Al(OPr^i)_4\}_{2\,or\,3}]$, $Co[Al(OPr^i)_4]_2$, $Ni[Al(OPr^i)_4]_2$, $Ni[Ga(OPr^i)_4]_2$, $Ni[Nb(OPr^i)_6]_2$, $[Ni[Ta[OPr^i]_6]_2$, $Ni[Zr_2(OPr^i)_9]_2$, and $Cu[Al(OPr^i)_4]_2$. As used herein, "$Pr^i$" indicates an isopropyl group. Without wishing to be bound by theory, it is believed that metal alkoxides with higher alkoxide molecular weights can have higher boiling points, which can provide the ability to accurately and reproducibly manipulate the properties of the catalyst surface using reaction temperature as a defining parameter.

Examples of metal carboxylates include zirconium acetato-propionate; $Zr(acac)_4$; dicalcium barium propionate, $Ca_2Ba(C_2H_5COO)_6$; zirconium propionate; $Zr(CH_3CH_2COO)_4$; lanthanum propionate; metal with chelating agents such as ethyl diamine and poly(ethyldiamine), phthalimide, where the metal is Zr, Ba, Ti, La, Sr, Ce, Nb, etc. In some embodiments, the metal chelate is

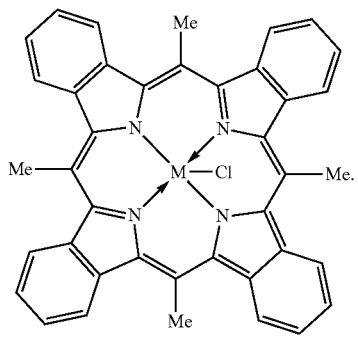

Examples of metal acetyl acetonates include titanium diisopropoxide bis(acetylacetonate) $(CH_3)_2CHO]_2Ti(C_5H_7O_2)_2)$; zirconium (IV) acetylacetonate; $Zr(C_5H_7O_2)_4$; palladium(II) acetylacetonate, $C_{10}H_{14}O_4Pd$; platinum(II) acetylacetonate, $Pt(C_5H_7O)_2$; titanium bis(acetylacetonate) dichloride; vanadyl acetylacetonate; chromium acetylacetonate; manganese(III) acetylacetonate; iron acetylacetonates; ruthenium acetylacetonates; cobalt acetylacetonates; iridium acetylacetonates; nickel(II) acetylacetonate; copper acetylacetonate; and/or zinc acetylacetonate.

In some embodiments, the solution that includes an organic solvent and an organometallic compound further includes oligomers or low molecular weight polymers (e.g., less than 5,000 molecular weight), such as poly(propylene glycol), poly(ethylene glycol), and copolymers thereof. In certain embodiments, the low molecular weight polymer is poly (propylene glycol)-block-poly(ethylene glycol)-block-poly(propylene glycol) and/or $H(OCH_2CH_2)_nOH$.

As an example, Table 1A lists the properties of vanadia and niobia, which can be taken into consideration when selecting niobia as a comparatively preferred surface modifier. As shown in Table 1A, niobium ethoxide (a metal alkoxide) is an example of a suitable organometallic reagent as it readily reacts (i.e., decomposes) in water, and melts at a low temperature (5° C.) such that when it is calcined, it affords niobia, which is a highly stable compound that has a melting point of 1512° C. and that is insoluble in water.

TABLE 1

Niobium Pentoxide as a Surface Modifier

| Property | Vanadia | Niobia | Niobium Ethoxide |
|---|---|---|---|
| Molecular Formula | $V_2O_5$ | $Nb_2O_5$ | $C_{10}H_{25}NbO_5$ |
| Molecular Mass (g/mol) | 181.88 | 265.81 | 318.209 |
| Appearance | Yellow Solid | White Solid | White Solid |
| Density (g/cm3) | 3.357 | 4.6 | 1.258 |
| Melting Point (° C.) | 690 | 1512 | 5° C. |
| Solubility in Water (20 ° C.) | Soluble (0.8 g/L) | Insoluble | N/A; reacts with water |

Without wishing to be bound by theory, it is believed that niobium is suitable as a surface modifier because of its ability to migrate to grain boundaries of metal alloys where it can effectively bind the grains together, thereby markedly improving the density and overall strength of a given alloy.

The structure of niobium ethoxide is shown below in Scheme 1. It is believed that the strong tendency to form covalent bonds can be exploited to enable amalgamation of the Nb surface modifier (i.e., Nb metal elements) with the selected substrate. Likewise, this property may help to bind grains of washcoat particles together and provide enhanced durability for a catalyst coating.

Scheme 1. Niobium ethoxide structure.

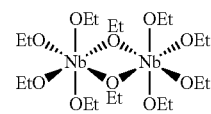

Other surface modifying metal oxides than Nb can be derived from organometallic reagents containing: Ca, Sc, Ti, V, Cr, Mn, Fe, Co, Ni, Cu, Y, Zr, Ru, Rh, Pd, Ag, Ba, W, La, Ce, Ta, Mo, Al, Si, Ge, Ir, Os, Re, and/or Pt.

Metal Oxide

In some embodiments, the metal oxide that the surface modifier can modify is cerium oxide (e.g., $CeO_2$), titanium oxide (e.g., $TiO_2$), zirconium oxide (e.g., $ZrO_2$), aluminum oxide ($Al_2O_3$), silicon oxide ($SiO_2$), hafnium oxide (e.g., $HfO_2$), vanadium oxide (e.g., $V_2O_5$, $V_2O_3$, $VO_2$), niobium oxide (e.g., $Nb_2O_5$, NbO), tantalum oxide (e.g., $Ta_2O_5$, $Ta_2O$), chromium oxide (e.g., $Cr_2O_3$), molybdenum oxide (e.g., $MoO_2$), tungsten oxide (e.g., $WO_3$), ruthenium oxide (e.g., $RuO_2$), rhodium oxide (e.g., $Rh_2O_3$), iridium oxide (e.g., $IrO_2$), nickel oxide (e.g., NiO), barium oxide (e.g., BaO), yttrium oxide (e.g., $Y_2O_3$), scandium oxide (e.g., $Sc_2O_3$), calcium oxide (e.g., CaO), manganese oxide (e.g., MgO), lanthanum oxide (e.g., $La_2O_3$), strontium oxide (e.g., SrO), cobalt oxide (e.g., CoO, $Co_2O_3$, $Co_3O_4$), and any combination thereof. In some embodiments, the metal oxide is a metal oxide different than a vanadium oxide. In some embodiments, the metal oxide is titanium oxide, zirconium oxide, and/or cerium oxide. In certain embodiments, the metal oxide is zirconium oxide and/or cerium oxide.

The metal oxide includes a cationic dopant. The cationic dopant can be $Sr^{2+}$, $Ru^{4+}$, $Rh^{3+}$, $Mg^{2+}$, $Cu^{2+}$, $Cu^{3+}$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, $Nb^{5+}$, $Y^{3+}$, $Sc^{3+}$, and $Ca^{2+}$. In some embodiments, the dopant includes a rare-earth metal (e.g., Sc, Y, La, Ce, Pr, Nd, Pm, Sm, Eu, Gd, Tb, Dy, Ho, Er, Tm, Yb, and/or Lu), at any positive oxidation state. In some embodiments, the dopant is Ru, Rh, or Cu. For example, the cationic dopant can be $Y^{3+}$, $Sc^{3+}$, and/or $Ca^{2+}$. In some embodiments, the cationic dopant is $Y^{3+}$. In certain embodiments, the cationic dopant is $Sc^{3+}$. In some embodiments, the cationic dopant is $Ca^{2+}$.

In some embodiments, the metal oxide can include 0.001 mol % or more (e.g., 0.01 mol % or more, 0.1 mol % or more, 0.5 mol % or more, 1 mol % or more, 2 mol % or more, 5 mol % or more, 7 mol % or more, 10 mol % or more, 15 mol % or more, 20 mol % or more, 25 mol % or more, 30 mol % or more, 35 mol % or more) and/or 40 mol % or less (e.g., 35 mol % or less, 30 mol % or less, 25 mol % or less, 20 mol % or less, 15 mol % or less, 10 mol % or less, 7 mol % or less, 5 mol % or less, 2 mol % or less, 1 mol % or less, 0.5 mol % or less, 0.1 mol % or less, or 0.01 mol % or less) of the cationic dopant, relative to the, relative to the total composition of the metal oxide (i.e., the metal oxide and any cationic dopants). For example, the metal oxide can include between 0.1 mol % and 25 mol % (e.g., between 0.1 mol % and 15 mol %, between 0.1 mol % and 10 mol %, between 5 and 10 mol %, or between 5 and 15 mol %) of the cationic dopant, relative to the total composition of the metal oxide. In some embodiments, the metal oxide includes about 3 mol %, about 8 mol %, or about 20 mol % of the cationic dopant, relative to the total composition of the metal oxide. As used herein, the term "about" indicates that the subject value can be modified by plus or minus 5% and still fall within the described and/or claimed embodiment.

In some embodiments, when the cationic dopant is $Y^{3+}$, $Sc^{3+}$, and/or $Ca^{2+}$, the metal oxide can include 0.1 mol % or more (e.g., 0.5 mol % or more, 1 mol % or more, 2 mol % or more, 5 mol % or more, 7 mol % or more, 10 mol % or more, 15 mol % or more, 20 mol % or more, 25 mol % or more, 30 mol % or more, 35 mol % or more) and/or 40 mol % or less (e.g., 35 mol % or less, 30 mol % or less, 25 mol % or less, 20 mol % or less, 15 mol % or less, 10 mol % or less, 7 mol % or less, 5 mol % or less, 2 mol % or less, 1 mol % or less, or 0.5 mol % or less) of the cationic dopant, relative to the total composition of the metal oxide. For example, the metal oxide can include between 0.1 mol % and 25 mol % (e.g., between 0.1 mol % and 15 mol %, between 0.1 mol % and 10 mol %, between 5 and 10 mol %, or between 5 and 15 mol %) of $Y^{3+}$, $Sc^{3+}$, and/or $Ca^{2+}$. In some embodiments, the metal oxide includes about 3 mol %, about 8 mol %, or about 20 mol % of $Y^{3+}$, $Sc^{3+}$, and/or $Ca^{2+}$.

In some embodiments, the metal oxide is yttria-doped zirconia (i.e., yttria-stabilized zirconia). In some embodiments, the metal oxide is yttria-doped ceria (i.e., yttria-stabilized ceria). In some embodiments, the metal oxide is yttria-doped mixed zirconia and ceria. The yttrium can be present in an amount of about 3 mol %, about 8 mol %, or about 20 mol % relative to the total composition of the metal oxide. In some embodiments, the yttrium is present in an amount of about 8 mol %, relative the total composition of the metal oxide. In some embodiments, the metal oxide is scandia-doped zirconia and/or ceria (i.e., scandia-stabilized zirconia and/or ceria). The scandium can be present in an amount of about 3 mol %, about 10 mol %, or about 20 mol %, relative to the total composition of the metal oxide. In some embodiments, the scandium is present in an amount of about 10 mol %, relative to the total composition of the metal oxide. In some embodiments, the metal oxide is calcium-doped zirconia and/or ceria (i.e., calcium-stabilized zirconia and/or ceria). The calcium can be present in an amount of about 5 mol %, about 10 mol %, about 16 mol %, or about 20 mol % relative to the total composition of the metal oxide. In some embodiments, the calcium is present in an amount of about 16 mol %, relative to the total composition of the metal oxide.

In some embodiments, the metal oxide is surface-modified with one or more metal elements, such as Nb (e.g., $Nb^{5+}$, $Nb^{4+}$), Ca (e.g., $Ca^{2+}$), Sc (e.g., $Sc^{3+}$), Ta (e.g., $Ta^{5+}$), Ti (e.g., $Ti^{4+}$), V (e.g., $V^{4+}$), Cr (e.g., $Cr^{3+}$), Mn (e.g., $Mn^{2+}$), Mo (e.g., $Mo^{3+}$), Al (e.g., $Al^{3+}$), Si (e.g., $Si^{4+}$), Ge (e.g., $Ge^{4+}$), Ir (e.g., $Ir^{4+}$), Os (e.g., $Os^{4+}$), Fe (e.g., $Fe^{3+}$), Co (e.g., $Co^{2+}$), Ni (e.g., $Ni^{2+}$), Cu (e.g., $Cu^+$), Y (e.g., $Y^{3+}$), Zr (e.g., $Zr^{4+}$), Ru (e.g., $Ru^{4+}$), Rh (e.g., $Rh^{3+}$), Pd (e.g., $Pd^{2+}$), Pt (e.g., $Pt^{2+}$), Ag (e.g., $Ag^+$), Ba (e.g., $Ba^{2+}$), W (e.g., $W^{6+}$, $W^{3+}$), La (e.g., $La^{3+}$), Re, and/or Ce (e.g., $Ce^{4+}$), each of which can be independently positively charged. As used herein, "metal elements" include both uncharged metal elements and metal cations. The one or more metal elements can form an intimate layer with an underlying metal oxide surface. In some embodiments, the one or more metal elements are covalently bonded to the underlying metal oxide surface, where, the one or more metal elements can occupy a location in the crystal lattice of the metal oxide in the form of a metal ion surrounded by the requisite number of oxide counter ions to achieve overall electrical neutrality. When the metal oxide is surface-modified, the metal oxide can further catalyze the conversion of NO to $NO_2$ and facilitate the NOx conversion to $N_2$ and $H_2O$, and/or the conversion of hydrocarbons to $CO_2$ and $H_2O$.

The metal element can be present in or on a metal oxide in an amount of 0.001 wt % or more (e.g., 0.01 wt % or more, 0.1 wt % or more, 1 wt % or more, 5 wt % or more, 10 wt % or more, 15 wt % or more, 20 wt % or more, 25 wt % or more, 30 wt % or more, or 35 wt % or more) and/or 40 wt % or less (e.g., 35 wt % or less, 30 wt % or less, 25 wt % or less, 20 wt % or less, 15 wt % or less, 10 wt % or less, 5 wt % or less, 1 wt % or less, 0.1 wt % or less, or 0.01 wt % or less), relative to the total composition of the metal oxide (i.e., the metal oxide including any cationic dopants and metal elements). In some embodiments, the metal element is present in or on a metal oxide in an amount of about 0.001 wt %, relative to the total composition of the metal oxide. In some embodiments, the metal element is present in or on a metal oxide in an amount of about 0.1 wt %, relative to the total composition of the metal oxide. In some embodiments, the metal element is present in or on a metal oxide in an amount of about 5 wt %, relative to the total composition of the metal oxide. In some embodiments, the metal element is present in or on a metal oxide in an amount of about 15 wt %, relative to the total composition of the metal oxide. In some embodiments, the metal element is present in or on a metal oxide in an amount of about 25 wt %, relative to the total composition of the metal oxide. In some embodiments, the metal element is present in or on a metal oxide in an amount of about 40 wt %, relative to the total composition of the metal oxide.

In some embodiments, the metal element is in the form of a layer having a thickness of from 0.001 nm (e.g., from 0.01 nm, from 0.1 nm, or from 0.5 nm) to 1 nm (e.g., to 0.5 nm, to 0.1 nm, to 0.01 nm). The layer can have a variety of morphologies, such as complex mosaic of functionalities or a uniformly transformed surface layer. Without wishing to be bound by theory, it is believed that as the organometallic reagent penetrates the metal oxide surface layers and chemically reacts with the metal oxide, a range of different stoichiometry of the resulting amalgam can occur as a function of depth of penetration and as a function of access to the particle surface. It is believed that these stoichiometric differences can result in the existence of catalytically active species in two or more valency states, thereby enhancing the catalytic redox properties of the resulting catalyst. The surface modification methods described herein can anchor active metal element moieties into the upper layers and enable catalytic sites to grow from the anchor sites. The catalytic sites can be more stable and less likely to migrate (i.e., sinter or cluster), and less likely to lose activity over time under high temperature conditions, thereby affording more robust and more durable catalysts. In some embodiments, the surface-modified catalysts can enhance specific surface area for desirable reactions to occur on the surface of the catalyst.

In some embodiments, the surface-modified metal oxide can serve as storage for NOx, $O_2$, and $NH_3$. For example, the surface-modified metal oxide can participate in redox reactions in the selective catalytic reduction system.

Metal Zeolite

In some embodiments, the metal zeolite that the surface modifier can modify is a Fe-doped aluminosilicate zeolite, a Cu-doped aluminosilicate zeolite, a Fe- and Cu-doped aluminosilicate zeolite, a Fe-doped silico-alumino-phosphate zeolite, a Cu-doped silico-alumino-phosphate zeolite, and/or a Fe and Cu-doped silico-alumino-phosphate zeolite.

In some embodiments, the metal zeolite is ZSM-5 (available from ACS Material), SSZ-13, or SAPO-34 (available from ACS Materials) that is Fe and/or Cu-doped.

The metal zeolite can include a Cu and/or a Fe dopant in an amount of from 0.01 wt % (e.g., from 0.1 wt %, from 1 wt %, from 2 wt %, from 3 wt %, or from 4 wt %) to 5 wt % (e.g., to 4 wt %, to 3 wt %, to 2 wt % to 1 wt %, or to 0.1 wt %), relative to the total metal zeolite composition.

In some embodiments, the metal zeolite is surface-modified with one or more metal elements, such as Nb (e.g., $Nb^{5+}$, $Nb^{4+}$), Ca (e.g., $Ca^{2+}$), Sc (e.g., $Sc^{3+}$), Ta (e.g., $Ta^{5+}$), Ti (e.g., $Ti^{4+}$), V (e.g., $V^{4+}$), Cr (e.g., $Cr^{3+}$), Mn (e.g., $Mn^{2+}$), Mo (e.g., $Mo^{3+}$), Al (e.g., $Al^{3+}$), Si (e.g., $Si^{4+}$), Ge (e.g., $Ge^{4+}$), Ir (e.g., $Ir^{4+}$), Os (e.g., $Os^{4+}$), Fe (e.g., $Fe^{3+}$), Co (e.g., $Co^{2+}$), Ni (e.g., $Ni^{2+}$), Cu (e.g., Cut), Y (e.g., $Y^{3+}$), Zr (e.g., $Zr^{4+}$), Ru (e.g., $Ru^{4+}$), Rh (e.g., $Rh^{3+}$), Pd (e.g., $Pd^{2+}$), Pt (e.g., $Pt^{2+}$), Ag (e.g., $Ag^+$), Ba (e.g., $Ba^{2+}$), W (e.g., $W^{6+}$, $W^{3+}$), La (e.g., $La^{3+}$), Re, and/or Ce (e.g., $Ce^{4+}$), each of which can be independently positively charged. In some embodiments, it is believed that surface modification of the metal zeolites modulates the water adsorbing ability of metal zeolites and can increase the rate at which water vapor can be removed from the catalyst composition at cold start, so that the catalyst composition can rapidly attain the desired reaction temperatures for effective emissions control. In some embodiments, it is believed that without surface modification, a metal zeolite can have relatively high levels water uptake and can become deactivated as the metal ions (e.g., $Cu^{2+}$ and $Cu^+$) that are the active sites are leached out of the metal zeolite. Furthermore, without surface modification, it is believed that a metal zeolite can lose adhesive properties and fall off the substrate onto which it is coated upon (e.g., a cordierite monolith or metallic substrate). Thus, surface modification of the metal zeolites with metallic elements (e.g., Nb in the form of niobium pentoxide) can enhance durability, NRE performance, as well as modulate the water uptake and desorption properties of metal zeolites. In some embodiments, the surface-modified metal zeolite can serve as a source for stored water at temperatures several hundred degrees above its boiling point.

Vanadium Oxide

In some embodiments, the vanadium oxide that the surface modifier can modify is VO; $V_2O_3$; $VO_2$; $V_2O_5$; phases with the general formula $V_nO_{2n+1}$ that exist between $V_2O_5$ and $VO_2$ such as $V_3O_7$, $V_4O_9$ and $V_6O_{13}$; phases with the general formula $V_nO_{2n-1}$ that exist between $VO_2$ and $V_2O_3$ such as $V_4O_7$, $V_5O_9$, $V_6O_{11}$, $V_7O_{13}$ and $V_8O_{15}$.

In some embodiments, the vanadium oxide is surface-modified with one or more metal elements, such as Nb (e.g., $Nb^{5+}$, $Nb^{4+}$), Ca (e.g., $Ca^{2+}$), Sc (e.g., $Sc^{3+}$), Ta (e.g., $Ta^{5+}$), Ti (e.g., $Ti^{4+}$), V (e.g., $V^{4+}$), Cr (e.g., $Cr^{3+}$), Mn (e.g., $Mn^{2+}$), Mo (e.g., $Mo^{3+}$), Al (e.g., $Al^{3+}$), Si (e.g., $Si^{4+}$), Ge (e.g., $Ge^{4+}$), Ir (e.g., $Ir^{4+}$), Os (e.g., $Os^{4+}$), Fe (e.g., $Fe^{3+}$), Co (e.g., $Co^{2+}$), Ni (e.g., $Ni^{2+}$), Cu (e.g., $Cu^+$), Y (e.g., $Y^{3+}$), Zr (e.g., $Zr^{4+}$), Ru (e.g., $Ru^{4+}$), Rh (e.g., $Rh^{3+}$), Pd (e.g., $Pd^{2+}$), Pt (e.g., $Pt^{2+}$), Ag (e.g., $Ag^+$), Ba (e.g., $Ba^{2+}$), W (e.g., $W^{6+}$, $W^{3+}$), La (e.g., $La^{3+}$), Re, and/or Ce (e.g., $Ce^{4+}$), each of which can be independently positively charged.

Catalyst Composition

In some embodiments, the metal oxide, the metal zeolite, the vanadium oxide, and/or each of their surface-modified counterparts are mixed in any combination to form a catalyst composition. For example, the catalyst composition can include from 2 wt % (e.g., from 5 wt %, from 10 wt %, from 15 wt %, from 20 wt %, from 30 wt %, from 40 wt %) to 50 wt % (e.g., to 40 wt %, to 30 wt %, to 20 wt %, to 15 wt %, to 10 wt %, to 5 wt %) of the surface-modified metal oxide catalyst, so long as the sum of the total amount of catalyst components of the catalyst composition is 100%.

In some embodiments, the catalyst composition includes from 50 wt % (e.g., from 60 wt %, from 70 wt %, from 80 wt %, from 85 wt %, from 90 wt %, or from 95 wt %) to 98 wt % (e.g., to 95 wt %, to 90 wt %, to 85 wt %, to 80 wt %, to 70 wt %, or to 60 wt %) of a surface-modified metal zeolite catalyst, so long as the sum of the total amount of catalyst components of the catalyst composition is 100%.

In some embodiments, the catalyst composition includes from 50 wt % (e.g., from 60 wt %, from 70 wt %, from 80 wt %, from 85 wt %, from 90 wt %, or from 95 wt %) to 98 wt % (e.g., to 95 wt %, to 90 wt %, to 85 wt %, to 80 wt %, to 70 wt %, or to 60 wt %) by weight of a surface-modified vanadium oxide catalyst, so long as the sum of the total amount of catalyst components of the catalyst composition is 100%.

In certain embodiments, the catalyst composition includes from 20 wt % (e.g., from 30 wt %, or from 40 wt %) to 50 wt % (e.g., to 40 wt %, or to 30 wt %) of the surface-modified metal oxide catalyst; the catalyst composition includes from 50 wt % (e.g., from 60 wt %, or from 70 wt %) to 80 wt % (e.g., to 70 wt %, or to 60 wt %) of a surface-modified metal zeolite catalyst; the catalyst composition includes from 50 wt % (e.g., from 60 wt %, or from 70 wt %) to 80 wt % (e.g., to 70 wt %, or to 60 wt %) by weight of a surface-modified vanadium oxide catalyst, so long as the sum of the total amount of catalyst components of the catalyst composition is 100%.

In some embodiments, the metal oxide in the catalyst composition has high thermal stability combined with electrical conductivity, ionic conductivity, or magnetic properties (e.g., paramagnetism, ferromagnetism, etc.). In some embodiments, the metal oxide is present in the form of a vanadate, niobiate, molybdate, borate, manganate, etc.

In some embodiments, the catalyst composition includes a metal oxide having a mixture of cationic dopants, such as $(BaTiO_3)(SrTiO_3)$.

In some embodiments, the metal oxide in the catalyst composition is one or more of yttria-stabilized zirconia, yttria-stabilized ceria, or yttria-stabilized ceria-zirconia mixed oxide; barium zirconate (e.g., $BaZrO_3$), and/or yttria-doped barium zirconium oxide (a spinel oxide with high proton conducting properties, such as $BaZr_{0.8}Y_{0.2}O_3$).

Examples of vanadates include ziesite (a copper vanadate mineral with formula $\beta$-$Cu_2V_2O_7$), bismuth copper vanadate (e.g., $BiCu_2VO_6$); lithium nickel vanadate (e.g., $Li_xNiVO_4$, where x=0.8, 1.0, or 1.2, such as $Li_{0.8}NiVO_4$ or $Li_{1.2}NiVO_4$); iron vanadate (e.g., $Fe_4(VO_4)_4.5H_2O$); ferric vanadate (e.g., $FeVO_4$); nickel vanadate (e.g., $Ni(VO_3)_2$); nickel vanadium oxide (e.g., $NiV_2O_6$); zirconium vanadate (e.g., $ZrV_2O_7$, $Zr(OH)_2(HOV_4)_2.2H_2O$); cerium vanadate (e.g., ortho-$Ce_2O_3.V_2O_5$, pyro-$2Ce_2O_3.3V_2O_5$, meta-$Ce_2O_3.3V_2O_5$, $CeVO_4$, or $CeV_2O_{10}$); barium vanadate ($Ba_3(VO_4)_2$); and/or manganese vanadate ($MnV_2O_6$).

In some embodiments, the metal oxide is barium strontium titanate ($Ba_{0.6}Sr_{0.4}TiO_3$, a semiconducting perovskite oxide); and/or lanthanum strontium cobalt oxide (e.g., $La_{0.6}Sr_{0.4}CoO_3$, a semiconducting perovskite oxide).

Examples of zeolites in the catalyst composition can include ZSM-5 and high temperature stable zeolites such as SAPO-34 and SSZ-13 (chabazite). In some embodiments, alternatively or in addition to zeolites, the catalyst composition can include vanadia-based SCR catalysts.

Without wishing to be bound by theory, it is believed that in the catalyst composition, the metal oxide can provide thermal stability to the metal zeolite, such that the increase in thermal stability is more than the additive thermal stabilities of the components of the catalyst composition.

When viewed microscopically, the catalyst composition can appear as a mixture of metal oxide catalyst particles and metal zeolite particles. If a metal element is present, the metal element can form an intimately mixed layer with the surface of the metal oxide catalyst, within the pores of the zeolites, and/or form an intimate mixed layer on the surface of the zeolites. The metal element can form a continuous or discontinuous coating on the surface of the metal oxide or the zeolite. The coating can have a thickness of from 0.001 nm (e.g., from 0.01 nm, from 0.1 nm, from 1 nm, from 10 nm, from 100 nm, or from 500 nm) to 1,000 nm (e.g., to 500 nm, to 100 nm, to 10 nm, to 1 nm, to 0.1 nm, or to 0.01 nm).

In some embodiments, rather than mixing the surface-modified catalysts to form a catalyst composition, the catalyst composition is made by mixing the catalyst precursor components and the reagents in a slurry, then applying the slurry to a substrate in an engine aftertreatment system, and calcining the substrate to obtain a surface-modified catalyst composition on the engine aftertreatment system substrate. For example, the slurry can contain an amount of a zeolite and an amount of a metal oxide (e.g., 81% CuZSM-5 and 19% nano-particle sized $ZrO_2$ (in the form of Nyacol)), organometallic surface modifier reagents, a solvent, and optional binders (e.g., a low molecular weight polymer). The slurry can be applied as a washcoat onto a suitable substrate and then calcined to obtain a durable surface-modified catalyst composition with high catalytic activity.

In some embodiments, a catalyst composition includes a single catalyst component, such as a surface-modified metal oxide, a surface-modified metal zeolite, or a surface-modified vanadium oxide.

Applications

In some embodiments, the surface-modified metal oxide and/or metal zeolite provides greater urea hydrolysis efficiency compared to a metal oxide and/or metal zeolite without surface modification. For example, the increased urea hydrolysis efficiency can result in between 10% and 20% less high molecular weight aromatic urea deposits in thermogravimetric analysis (TGA) studies with 50% urea solution, and can demonstrate rapid and relatively complete $NH_3$ decomposition at a lower temperature (e.g., about 50° C. or lower in temperature compared to a non-surface modified metal oxide). The increased urea hydrolysis efficiency can facilitate urea dosing at lower exhaust temperatures and more efficient utilization of the urea reductant, as well as reducing urea deposit formation.

In some embodiments, the surface-modified metal oxide and/or metal zeolite has a smaller BET surface area compared to a metal oxide and/or metal zeolite without surface modification. The reduced BET surface area can be a quick and easy way to determine that the surface modification has taken place, as a surface-modified metal oxide or metal zeolite can agglomerate together and thereby provide increased durability.

In some embodiments, the surface-modified metal oxide and/or metal zeolite has a greater $NO_x$ reduction efficiency compared to a metal oxide and/or zeolite without surface modification. For example, the surface-modified metal oxide and/or metal zeolite can increase the NOx reduction efficiency by at least 0.1% (e.g., at least 1%, at least 5%, at least 10%, at least 20%, or at least 30%) and/or up to 40% (e.g., up to 30%, up to 20%, up to 10%, up to 5%, or up to 1%), compared to a metal oxide and/or metal zeolite without surface modification.

In some embodiments, the surface-modified metal oxide and/or metal zeolite has increased durability compared to a metal oxide and/or metal zeolite without surface modification, as illustrated in Example 3, below.

The surface-modified metal oxide and/or metal zeolite can be used to enhance catalyst durability, enhance NOx reduction efficiency (NRE), moderate water uptake and enhance water desorption (e.g., for cold start), catalyze urea hydrolysis at the point of DEF dosing, and/or facilitate urea deposit decomposition, thus decreasing deposit build-up in the SCR which can cause fouling and damage to the metal oxide and/or metal zeolite and substrate. In some embodiments, the surface-modified metal oxide and/or metal zeolite can modulate the oxidative power of washcoat components (e.g., metal oxide such as ceria), can facilitate selective catalytic oxidation (SCO) in parallel with the typical SCR reactions; and can facilitate in situ formation of $NO_2$ reaction intermediates in environments where $NO_2$ concentrations are below the desired levels (i.e., $NO_2/NOx=0.5$); hydrocarbon (HC) and carbon monoxide (CO) oxidation in the SCR, while leaving $NH_3$ relatively unaffected. In some embodiments, the surface-modified catalyst compositions (e.g., barium oxide ($BaO_2$) surface-modified metal oxides) modulate NOx storage compared to non-surface modified compositions (e.g., zirconia-based metal oxides and ceria-based metal oxides), to meet low temperature emissions standards. In some embodiments, the surface-modified catalyst compositions enable low cost and compact platinum group metal-free DOC development, which are based upon the use of selected metals (e.g., Ni, Co, Fe, Cu, or even Ag, and Pd in low concentrations) as surface modifiers, as described in U.S. Ser. No. 14/935,001, entitled "Diesel Oxidation Catalyst with Minimal Platinum Group Metal Content," filed concurrently with the present application and herein incorporated by reference in its entirety. In some embodiments, the surface-modified catalyst composition can provide an improved NOx sensor, which is relatively insensitive to $NH_3$ and other exhaust species.

The surface-modified metal oxides and/or zeolites, or a slurry containing metal oxides and/or zeolites and the organometallic reagents, can be used in variety of engine aftertreatment applications. For example, in some embodiments, the surface-modified metal oxides and/or zeolites or the slurry can be face painted onto the SCR bricks (e.g., a cordierite core). In an inline configuration (with one brick in front of another) either the front brick, or both of the SCR bricks may be face painted in this manner. In some embodiments, the surface-modified catalyst composition or the slurry can be zone coated at the front of the SCR brick, to a depth of, for example, 3-6 inches. If a slurry was used, as described above, the coated SCR bricks can be calcined to provide a surface-modified catalyst composition on the SCR bricks.

In some embodiments, the surface-modified catalyst composition can be used as a homogenous mixture with known SCR catalysts (such as Cu-zeolite or vanadium-based catalyst) to improve SCR function. In some embodiments, the surface-modified catalyst composition can be used as a urea hydrolysis catalyst coated onto impact mixers and relevant parts of the exhaust system. In some embodiments, the surface-modified catalyst composition can be used in novel sensor technologies (e.g., $NH_3$ insensitive NOx sensor). In some embodiments, the surface-modified catalyst composition can be used as a PGM-free DOC. In some embodiments, the surface-modified catalyst composition can be used as a SCR catalyst on DPF (i.e., SCRF). Examples of surface-modified catalyst compositions and their applications are shown, for example, in Table 1B.

| # | DOPED MIXED OXIDE | APPLICATION | ORGANOMETALLIC MODIFICATION | INORGANIC REAGENT MODIFICATION | BENEFIT |
|---|---|---|---|---|---|
| 1 | $ZrO_2$ | (1) Urea Hydrolysis Catalyst (2) NOx Sensor | (1) Niobium Ethoxide, $Nb_2(OC_2H_5)_{10}$ (2) Barium Ethoxide, $C_4H_{10}BaO_2$ | (1) n/a (2) n/a | (1) Urea Hydrolysis for Low Temperature DEF Dosing (2) Low $NH_3$ Cross-sensitive NOx Sensor |
| 2 | YSZ-8 | (1) DOC (2) Hydrolysis Catalyst (3) SRC on DPF (SCRF) (4) SCR (5) NOx Sensor | (1) Barium Ethoxide, $C_4H_{10}BaO_2$ (2) Titanium(IV) Ethoxide; $Ti(OC_2H_5)_4$) (3) Niobium Ethoxide, $Nb_2(OC_2H_5)_{10}$ (4) Vanadium Ethoxide, $V(OC_2H_5)_3$ (5) Niobium Ethoxide, $Nb_2(OC_2H_5)_{10}$ | (1) Palladium & Platinum Chloride (2) n/a (3) Nickel Chloride (4) Ferric Chloride (5) Barium Nitrate | (1) NOx Storage/NOx, HC CO Oxidation (2) Urea/NHCO Catalyst (3) Combined with Metal-Zeolite for NRE (4) Combined with Metal-Zeolite for NRE (5) Low $NH_3$ Cross-sensitive NOx Sensor |
| 3 | YSC-10 | (1) DOC (2) SRC on DPF (SCRF) (3) SCR | (1) Barium Ethoxide, $C_4H_{10}BaO_2$ (2) Niobium Ethoxide, $Nb_2(OC_2H_5)_{10}$ (3) Vanadium Ethoxide, $V(OC_2H_5)_3$ | (1) Silver Nitrate (2) n/a (3) Copper sulfate | (1) NOx Storage/NOx, HC CO Oxidation (2) Combined with Metal-Zeolite for NRE (3) Combined with Metal-Zeolite for NRE |
| 4 | $CeO_2$—$ZrO_2$ | (1) DOC (2) SRC on DPF (SCRF) (3) SCR | (1) Barium Ethoxide, $C_4H_{10}BaO_2$ (2) Niobium Ethoxide, $Nb_2(OC_2H_5)_{10}$ (3) Vanadium Ethoxide, $V(OC_2H_5)_3$ | (1) Silver Nitrate (2) n/a (3) Copper sulfate | (1) NOx Storage/NOx, HC CO Oxidation (2) Combined with Metal-Zeolite for NRE (3) Combined with Metal-Zeolite for NRE |
| 5 | Lanthanum Strontium Cobalt Oxide, $La_{0.6}Sr_{0.4}CoO_3$ | (1) DOC (2) Hydrolysis Catalyst (3) SRC on DPF (SCRF) (3) SCR | (1) n/a (2) Titanium(IV) Ethoxide; $Ti(OC_2H_5)_4$) (3) Barium Ethoxide, $C_4H_{10}BaO_2$ (3) Manganese Methoxide, $C_2H_6MnO_2$ | (1) Barium Chloride (2) n/a (3) Nickel Chloride (4) n/a | (1) NOx Storage/NOx, HC CO Oxidation (2) Urea/NHCO Catalyst (3) Combined with Metal-Zeolite for NRE (4) Combined with Vanadia for NRE |
| 6 | Zirconium Vanadate, $ZrV_2O_7$, $ZrVO_3$ | (1) SRC on DPF (SCRF) (2) SCR | (1) Niobium Ethoxide, $Nb_2(OC_2H_5)_{10}$ (2) n/a | (1) Cobalt Nitrate (2) Nickel Nitrate | (1) Combined with Metal-Zeolite for NRE (2) Combined with Metal-Zeolite for NRE |
| 8 | Cerium Vanadate, $CeVO_4$, $CeV_2O_{10}$ | (1) SRC on DPF (SCRF) (2) SCR | (1) n/a (2) Niobium Ethoxide, Nb2(OC2H5)10 | (1) Ferric Chloride (2) n/a | (1) Combined with Metal-Zeolite for NRE (2) Combined with Metal-Zeolite for NRE |
| 9 | Barium Zirconate, $BaZrO3$ | (1) DOC (2) SRC on DPF (SCRF) (3) SCR | (1) Molybdenum Ethoxide, $Mo(OCH_2CH_3)_5$ (2) Titanium(IV) Ethoxide; $Ti(OC_2H_5)_4$ | (1) n/a (2) n/a (3) n/a | (1) NOx Storage/NOx, HC CO Oxidation (2) Combined with Metal-Zeolite for NRE |

| # | DOPED MIXED OXIDE | APPLICATION | ORGANOMETALLIC MODIFICATION | INORGANIC REAGENT MODIFICATION | BENEFIT |
|---|---|---|---|---|---|
| 10 | Yttria doped barium zirconium oxide, $BaZr_{0.8}Y_{0.2}O_3$ | (1) DOC (2) SRC on DPF (SCRF) (3) SCR | (1) Molybdenum Ethoxide, $Mo(OCH_2CH_3)_5$ (2) Titanium(IV) Ethoxide; $Ti(OC_2H_5)_4$ (3) Niobium Ethoxide, $Nb_2(OC_2H_5)_{10}$ | (1) n/a (2) n/a (3) n/a | (1) NOx Storage/NOx, HC CO Oxidation (2) Combined with Metal-Zeolite for NRE (3) Combined with Metal-Zeolite for NRE |

Figure 1B:
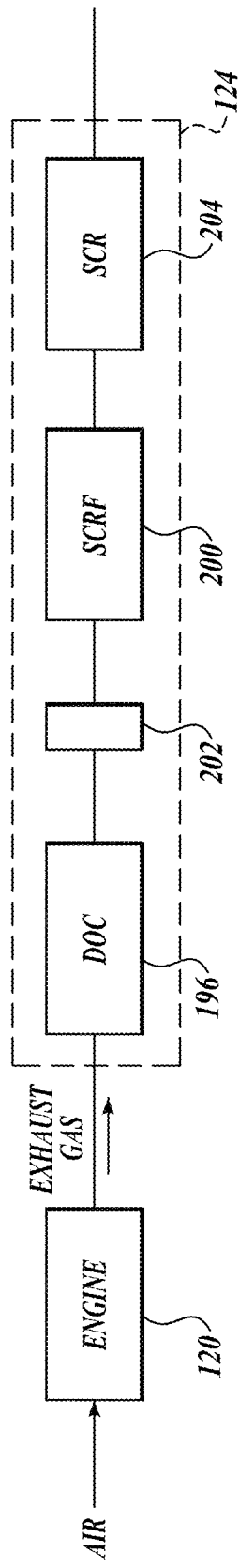
FIG. 1B is a block diagram of an example of an aftertreatment system coupled to an internal combustion engine.
Figure 1C:
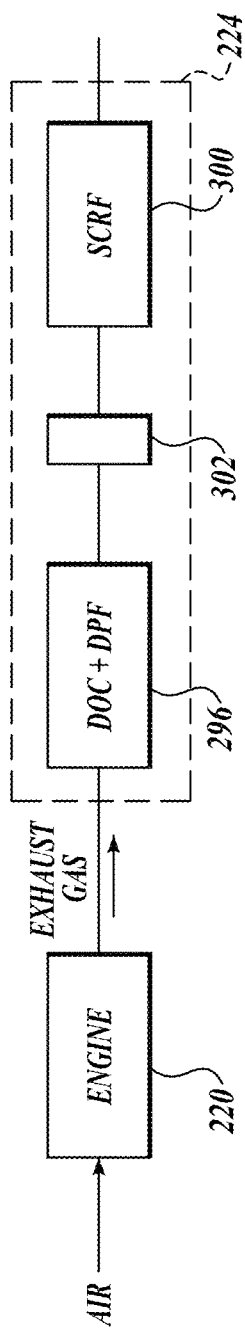
FIG. 1C is a block diagram of an example of an aftertreatment system coupled to an internal combustion engine.

The surface-modified catalyst composition or a slurry containing non-surface-modified metal oxide and/or zeolite and organometallic reagents (i.e., catalyst precursors), can be applied in a variety of locations within an engine aftertreatment system. As described above, the slurry can be calcined to provide a surface-modified catalyst composition in an engine aftertreatment system. For example, referring to FIG. 1A, the surface-modified catalyst composition can be used as a SCR catalyst in a diesel particulate filter in a SCR system 104, such as a wall-flow filter, and particularly the monolithic core of the wall-flow filter. In some embodiments, the selective-modified catalyst composition can lead to more compact exhaust aftertreatment systems. For example, referring to FIG. 1B, an exhaust aftertreatment system 124 includes a diesel oxidation catalytic system 196 upstream of a diesel exhaust fluid doser 202. A selective catalytic reduction on-filter (SCRF) 200 is downstream of the diesel exhaust fluid doser 202, and SCRF 200 is followed by a selective catalytic reduction system 204. The SCRF includes a diesel particulate filter (DPF) with a catalytic core having a surface-modified catalyst composition that serves as a SCR catalyst loaded thereon, thereby providing a compact SCRF that combines the functions of both a DPF and a selective catalytic reduction system. In some embodiments, referring to FIG. 1C, an exhaust aftertreatment system 224 includes a combined diesel oxidation catalytic system ("DOC") and a diesel particulate filter 296 upstream of a diesel exhaust fluid doser 302. Downstream of the diesel exhaust fluid doser 302 is SCRF 300, which includes a DPF with a catalytic core having a surface-modified catalyst composition loaded thereon. Exhaust aftertreatment system 224 has a DPF both upstream and downstream of the mixer and therefore increases the filter capacity. As shown in FIG. 1C, exhaust aftertreatment system 224 is more compact than the exhaust aftertreatment system 124 shown in FIG. 1B.

The surface-modified catalyst composition can assist in making $NO_2$ in situ without significantly oxidizing $NH_3$ (i.e., by selective catalytic oxidation), while also catalyzing the reduction of NOx (i.e., by selective catalytic reduction), such that the catalyst simultaneously exhibits selective catalytic oxidation and selective catalytic reduction properties. The surface-modified catalyst composition can be provided in the internal surface areas of the wall-flow filter in a manner such that the distribution or loading of the catalyst composition is generally symmetrical across the wall. The surface-modified catalyst composition can increase the thermal resistance of its individual components (i.e., a metal oxide catalyst, a metal oxide catalyst that is other than a vanadium oxide catalyst, a vanadium oxide catalyst, and/or a metal zeolite catalyst), such that the components can synergistically interact to provide a more robust catalyst composition.

As used herein, a selective catalytic oxidation (SCO) catalyst is a catalyst that facilitates formation of $NO_2$ species in situ by the reaction of $NO+\frac{1}{2}O_2 \rightarrow NO_2$, to serve as reactive intermediates from nitrogen oxides in the exhaust stream, without significantly oxidizing $NH_3$ into $N_2O$.

As used herein, a selective catalytic reduction (SCR) catalyst is a catalyst that catalyzes the reduction of NOx to nitrogen and water.

The following examples are included for the purpose of illustrating, not limiting, the described embodiments.

Example 1 describes the synthesis and characterization of niobia surface-modified redox metal oxides. Example 2 describes the synthesis and characterization of niobia surface-modified SAPO-34 for improved durability washcoat. Example 3 describes a process for simultaneous washcoat preparation and surface modification of catalyst precursors. Example 4 describes core samples coated with a composition of Example 3 and the evaluation of water uptake and desorption properties of the coated core samples. Example 5 describes a high efficiency urea hydrolysis catalyst. Example 6 describes improved NRE with surface-modified catalysts. Example 7 describes the oxidative power modulation of redox metal oxides for simultaneous SRC and SCO.

EXAMPLES

Abbreviations

YSZ: yttria-stabilized zirconia
YSC: yttria-stabilized ceria
PEG: poly(ethylene glycol)
PPG: poly(propylene glycol)
PEO: polyethylene oxide
DI water: deionized water
DOC: diesel oxidation catalyst
GHSV: gas hourly spatial velocity
NRE: NOx reduction efficiency Example 1. Niobia Surface-Modified Redox Metal Oxides Niobium pentoxide ($Nb_2O_5$) surface modifier was applied to redox metal oxide catalyst precursors by reaction with niobium ethoxide dissolved in isopropanol (IPA) with:
  1. zirconia stabilized with 8 mol % yttria (YSZ-8);
  2. ceria stabilized with 10 mol % yttria (YSC-10); or
  3. ceria-zirconia ($CeO_2$—$ZrO_2$).

Yttria stabilized zirconia was obtained from MEL Chemicals, while all other reagents were obtained from Sigma-Aldrich.

Procedure

10% Niobium ethoxide was prepared in isopropanol and was added to the amount of two component redox metal oxides; in an amount sufficient to obtain a composition after calcining to form ($Nb_2O_5$) equivalent to:
1. 10 wt % NbEtO/90 wt % YSZ-8 [8 mol % yttria stabilized zirconia]
2. 10 wt % NbEtO/90 wt % YSC-10 [10 mol % yttria stabilized ceria]
3. 10 wt % NbEtO/90 wt % $CeO_2$—$ZrO_2$) [50% ceria in 50% zirconia]

The mixture was milled in a SPEX SAMPLEPREP MIXER MILL with methyl methacrylate balls for 20-30 minutes. Air drying in a fume hood was conducted, and over drying at 105° C. completed the drying process. Calcining was conducted by increasing the temperature to 500° C. at a rate of 15° C./minute. 500° C. was maintained for 5 hours and cooling was accomplished at a rate of 15° C./minute, down to 30° C.

The catalysts were characterized by X-ray diffraction, BET (Brunauer, Emmett, and Teller surface area analysis), SEM/EDAX (scanning electron microscopy and energy dispersive x-ray analysis), and Raman analytical techniques, by comparison with the corresponding untreated metal oxide.

Figure 2:
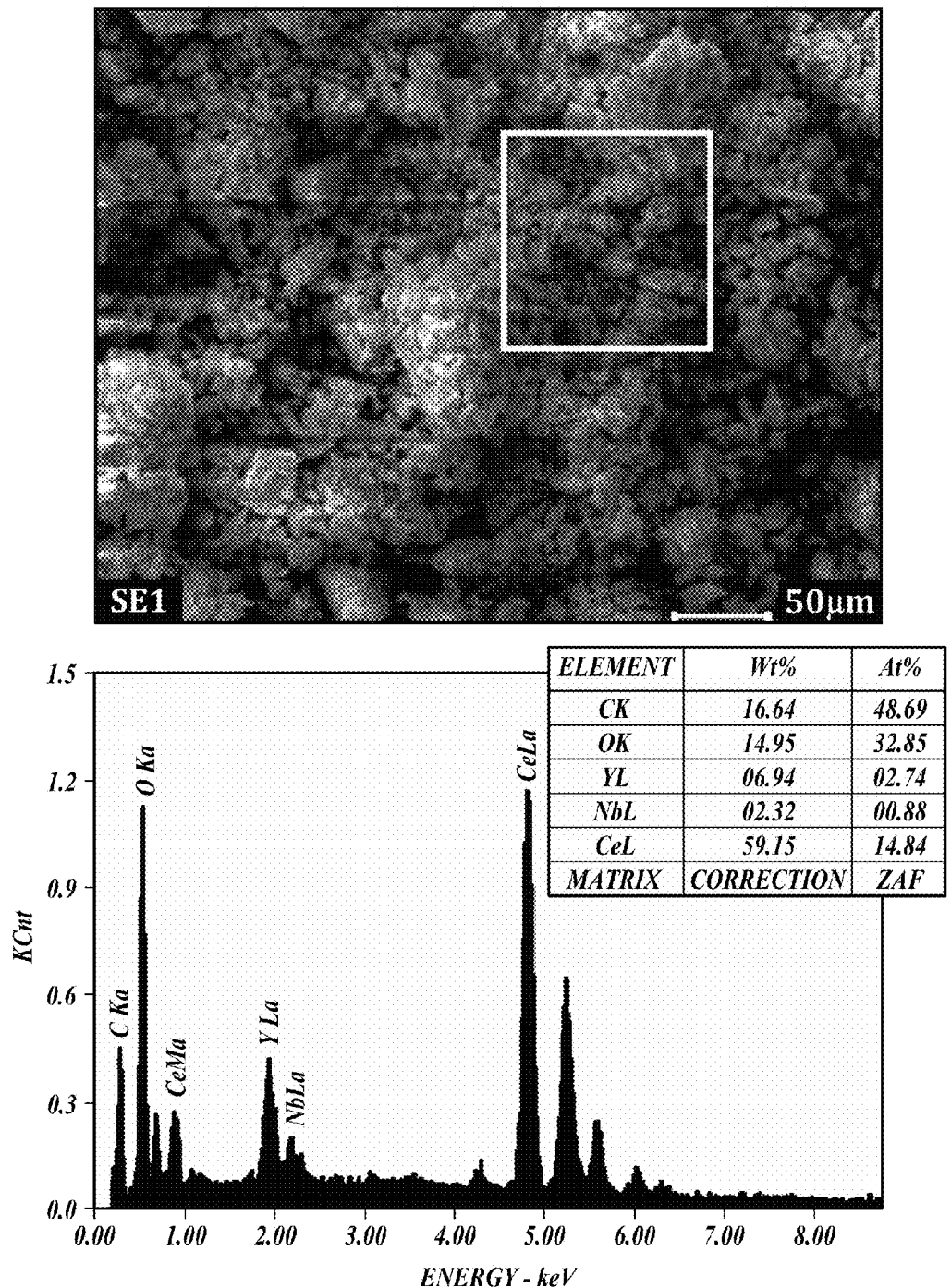
FIG. 2 is a scanning electron micrograph (top) and energy dispersive x-ray spectroscopy analysis (bottom) of a niobium pentoxide surface-modified yttrium stabilized ceria (YSC-10).
Figure 3:
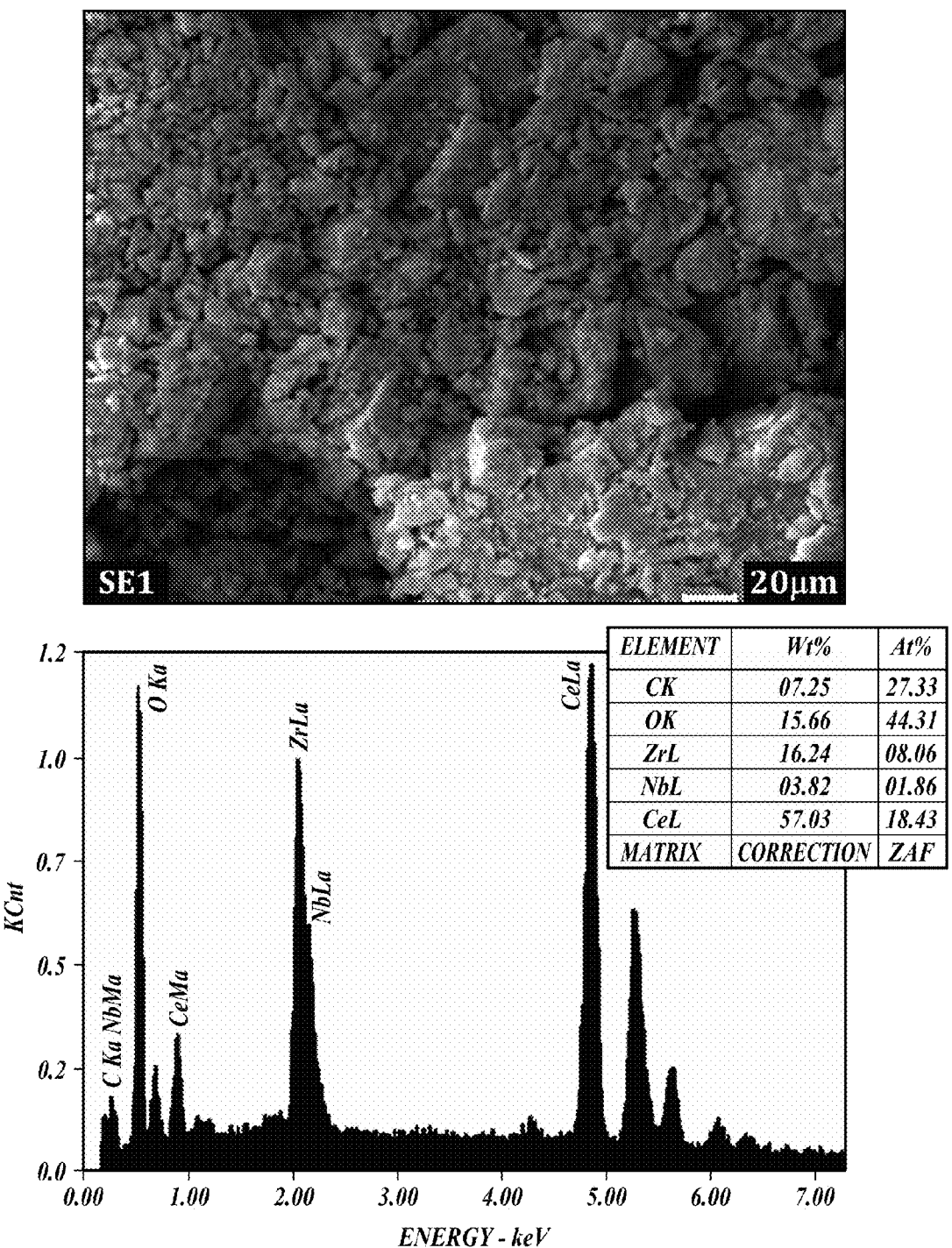
FIG. 3 is a scanning electron micrograph (top) and energy dispersive x-ray spectroscopy analysis (bottom) of a niobium pentoxide surface-modified $CeO_2$—$ZrO_2$.
Figure 4:
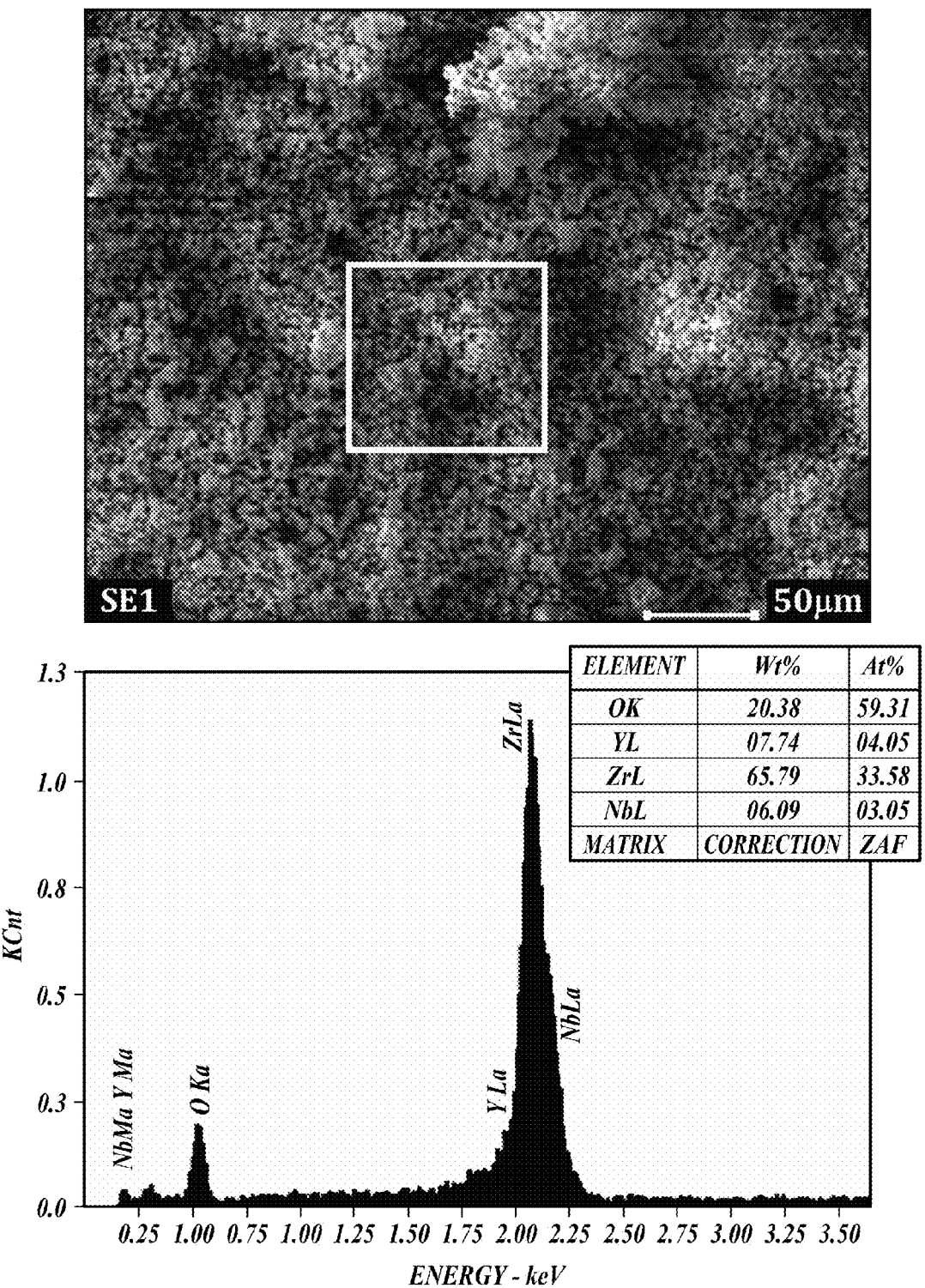
FIG. 4 is a scanning electron micrograph (top) and energy dispersive x-ray spectroscopy analysis (bottom) of a niobium pentoxide surface-modified yttrium stabilized zirconia (YSZ-8).

The effect of $N_2O_5$ surface modification on the surface area of metal oxide catalyst precursors is shown in Table 2. SEM/EDAX analysis of the surface-modified precursors is shown in FIGS. 2-4.

isopropanol, 3.4% niobium ethoxide (Sigma-Aldrich), and 29.9% SAPO-34 (ACS Materials). The crystal structure of SAPO-34 (a micro pore zeolite) is similar to that of chabazite and has a special water absorbing capacity and Bronsted acidity. SAPO-34 can be used as an adsorbent, catalyst, and/or catalyst support in various applications. The slurry composition was found to be stable when its properties were monitored of over 30 days Slurry 2 was a control slurry with a similar composition, where DI water was used as the solvent and niobium ethoxide was eliminated from the formulation Washcoat Procedure The slurries were mixed 1 hr in a ball mill and test samples prepared. Alumina TGA weighing pans were coated (for durability testing). (1"×1") cordierite core samples were washcoated, by a modified dip-coating method employing vacuum.

All samples were dried in air, then at 110° C., and calcining was conducted at 550° C. for 2 hrs.

Durability Test:

70 psi $N_2$ from a gas cylinder is applied a prolonged burst to the coated article, and the weight before and after are compared. A weight loss of ≤3% is considered to be highly durable.

TABLE 2

Effect of $Nb_2O_5$ surface modifier on BET surface area of metal oxide particles.

| Property | YSC-10 | YSC-10/Nb | $CeO_2$—$ZrO_2$ | $CeO_2$—$ZrO_2$/Nb | YSZ-8 | YSZ-8/Nb |
|---|---|---|---|---|---|---|
| $Nb_2O_5$ Loading (%) | 0 | 3.4 | 0 | 5 | 0 | 7.7 |
| BET Surface Area ($m^2$/g) | 45.4736 | 35.8066 | 40.6634 | 36.3771 | 17.187 | 12.3182 |
| Decline in Surface Area (%) | N/A | 21.3 | Not Available | 10.5 | N/A | 28.3 |

Example 2. Niobia Surface-Modified SAPO-34 Particles for Improved Durability Washcoat SAPO-34 (from ACS Materials) was surface-modified with niobium ethoxide as described in Example 1. The results derived from SEM/EDAX analysis clearly show that that both surface coating of the SAPO-34 crystals and clustering of nano-particles of $Nb_2O_5$ were achieved to potentially contribute to both improved NRE and washcoat durability, simultaneously.

Figure 5:
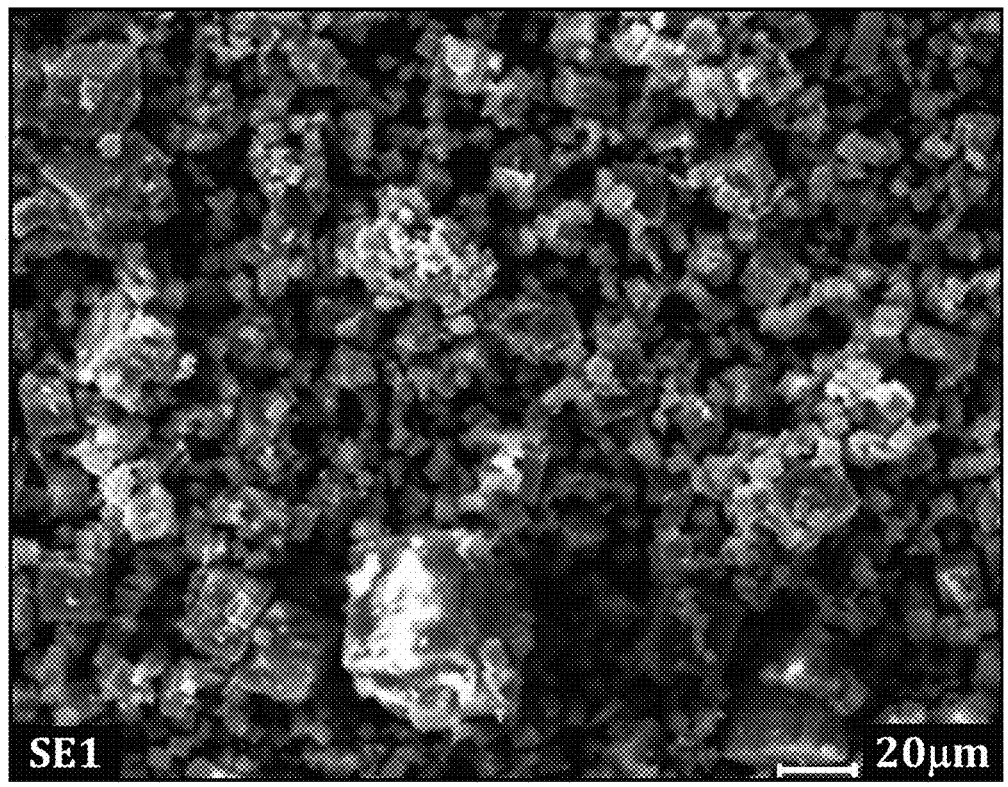
FIG. 5 is a low magnification scanning electron micrograph (top) and energy dispersive x-ray spectroscopy analysis (bottom) of a niobium pentoxide surface-modified SAPO-34 zeolite.
Figure 6:
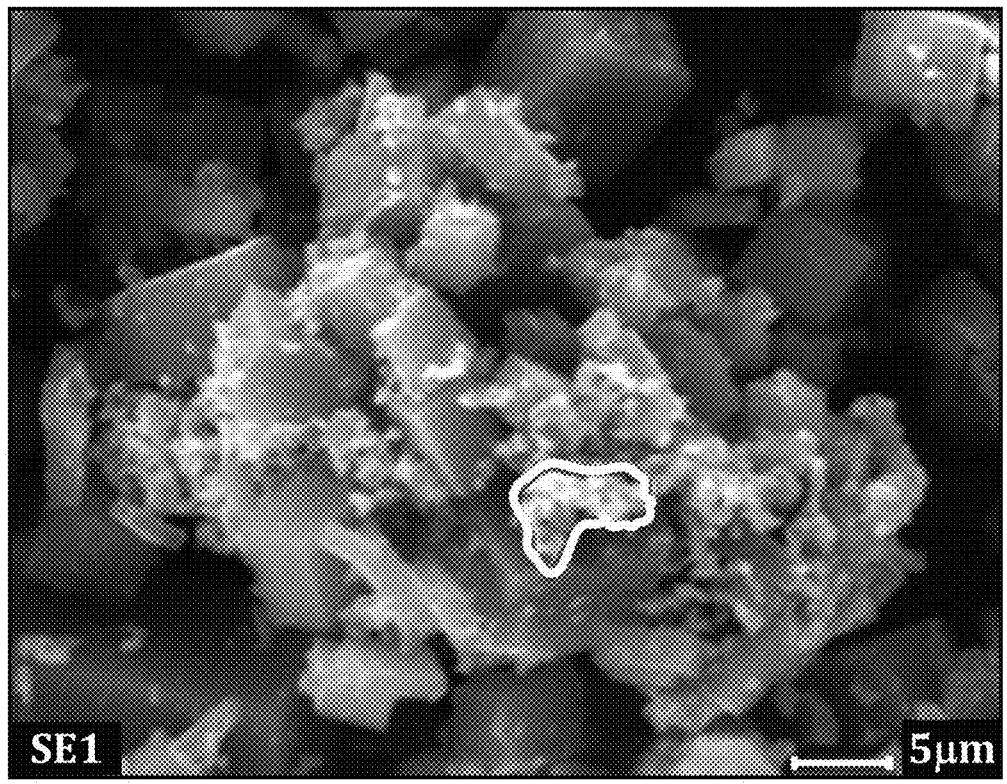
FIG. 6 is a high magnification scanning electron micrograph (top) and energy dispersive x-ray spectroscopy analysis (bottom) of a niobium pentoxide surface-modified SAPO-34 zeolite.
Figure 7:
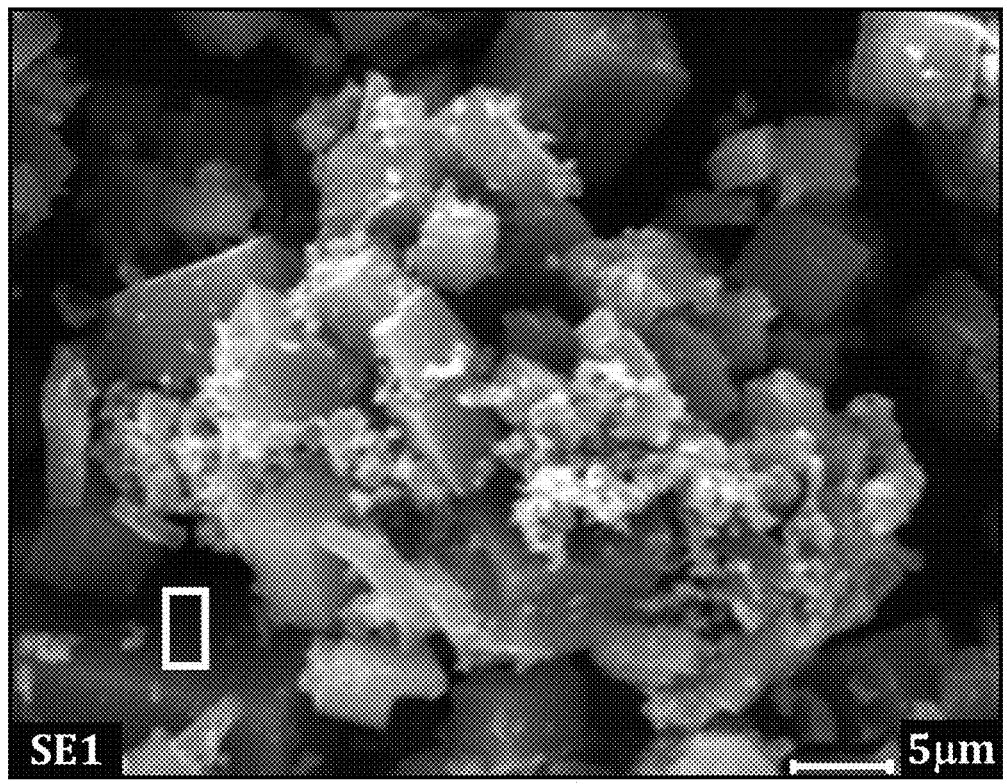
FIG. 7 is a high magnification scanning electron micrograph (top) and energy dispersive x-ray spectroscopy analysis (bottom) of a niobium pentoxide surface-modified SAPO-34 zeolite.
Figure 9A:
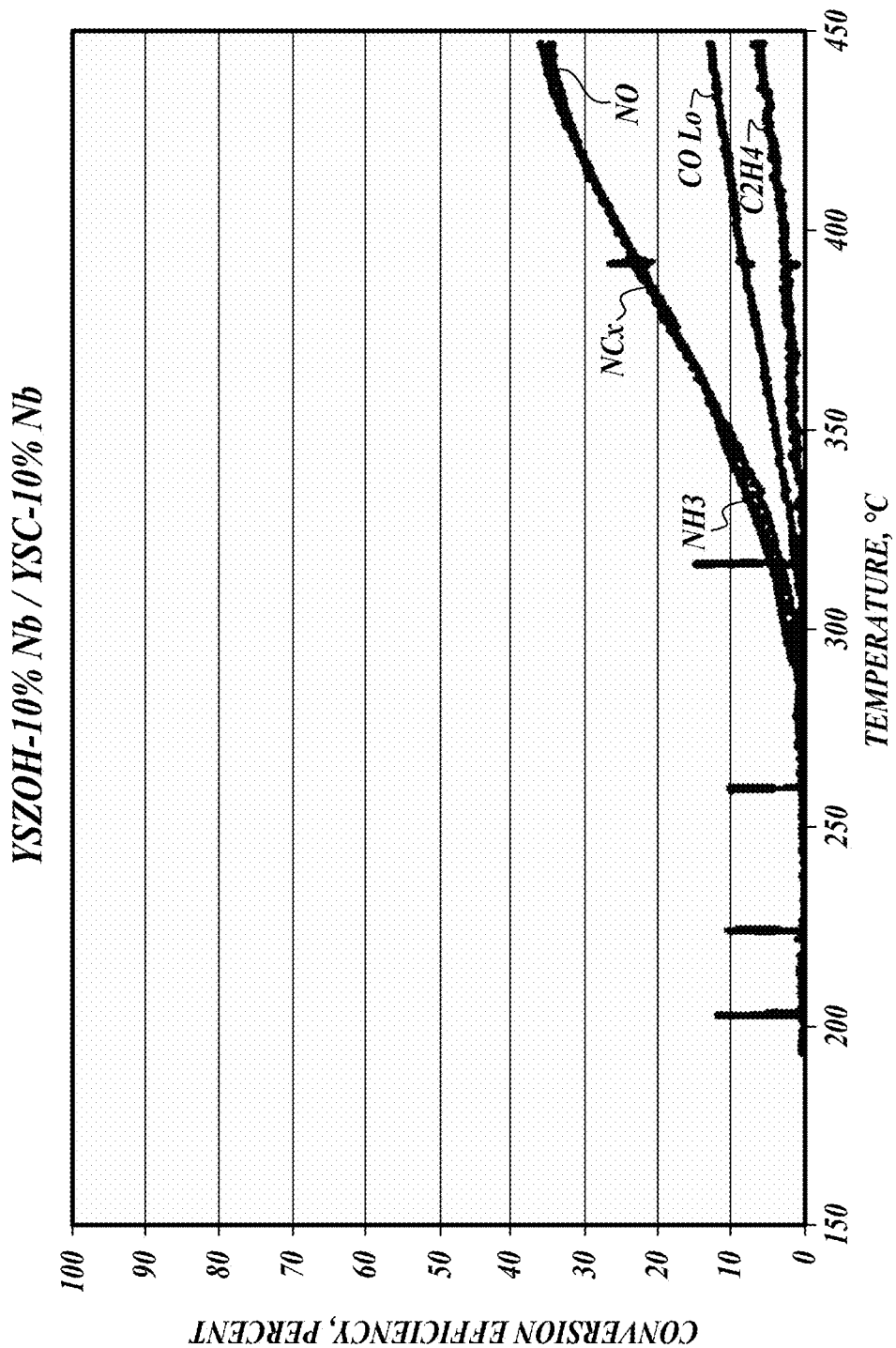
FIGS. 9A-9B are a graph of a conversion efficiency (9A) and a graph of gas emission composition (9B) of a Nb-surface-modified YSZ/YSC (YSZ-10% Nb/YSC-10% Nb).
Figure 9B:
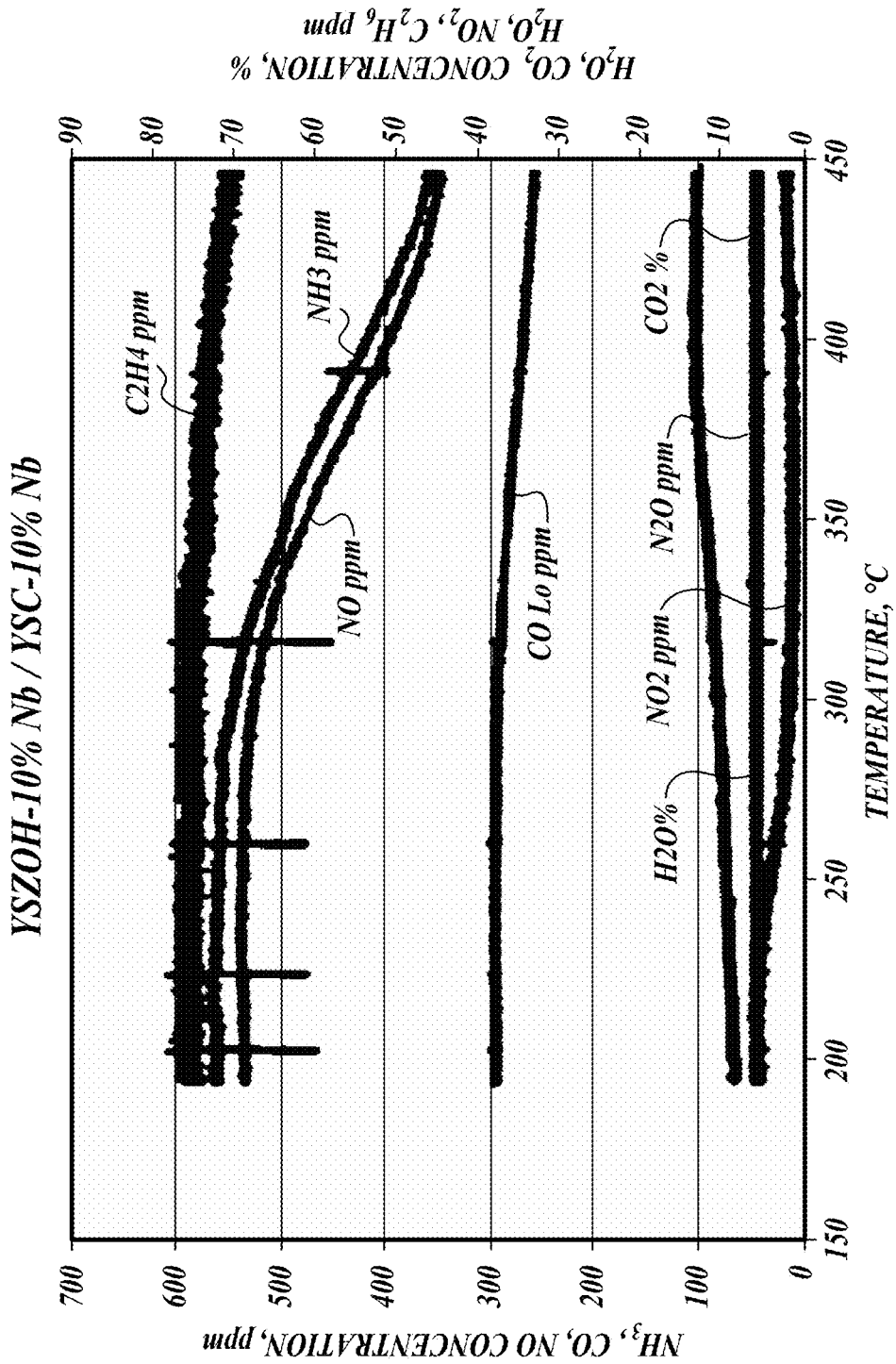
Figure 10A:
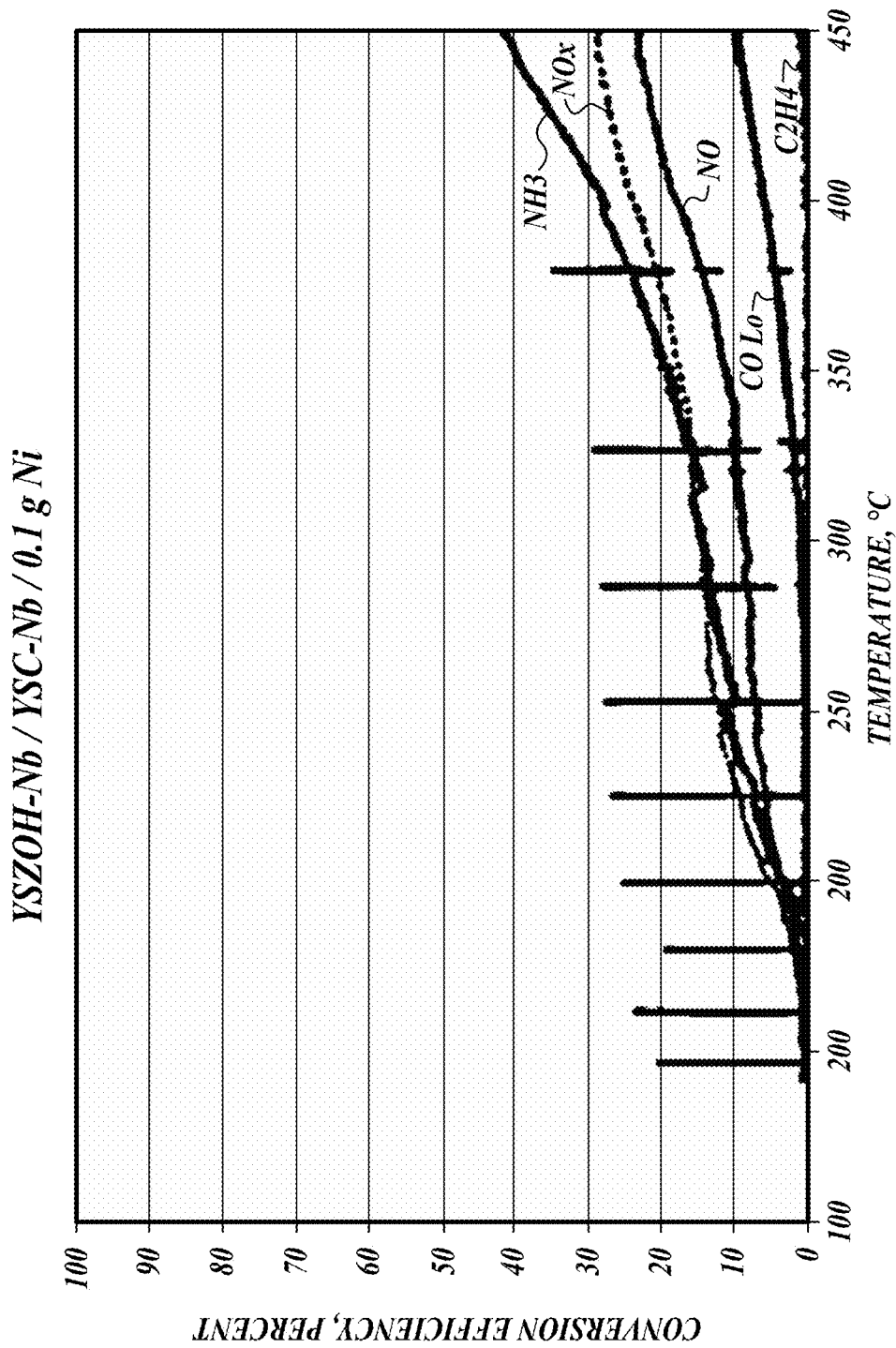
FIGS. 10A-10B are a graph of a conversion efficiency (10A) and a graph of gas emission composition (10B) of a Nb-surface-modified YSZ/YSC containing 0.1 g absolute amount of Ni.
Figure 10B:
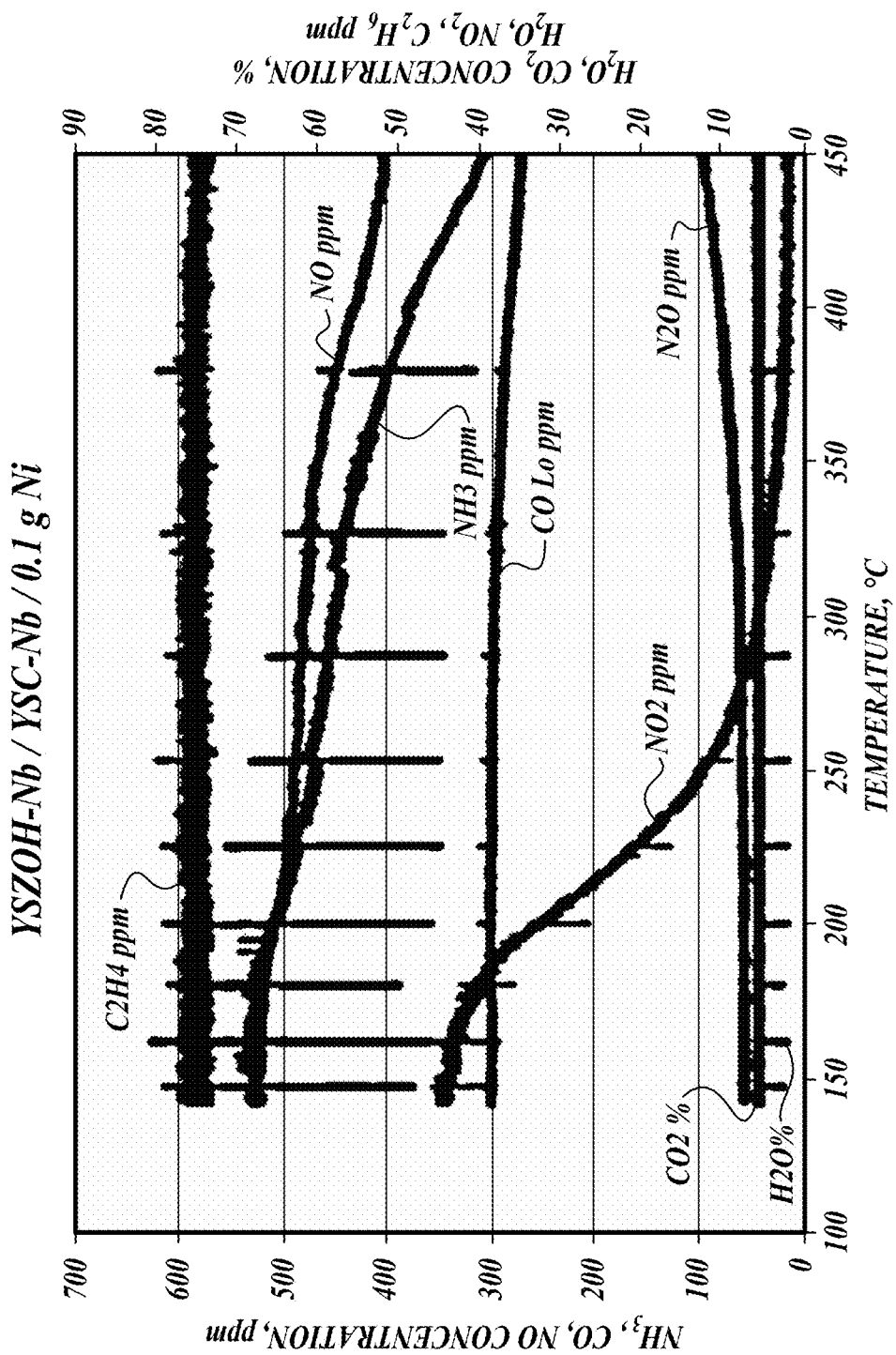
Figure 11A:
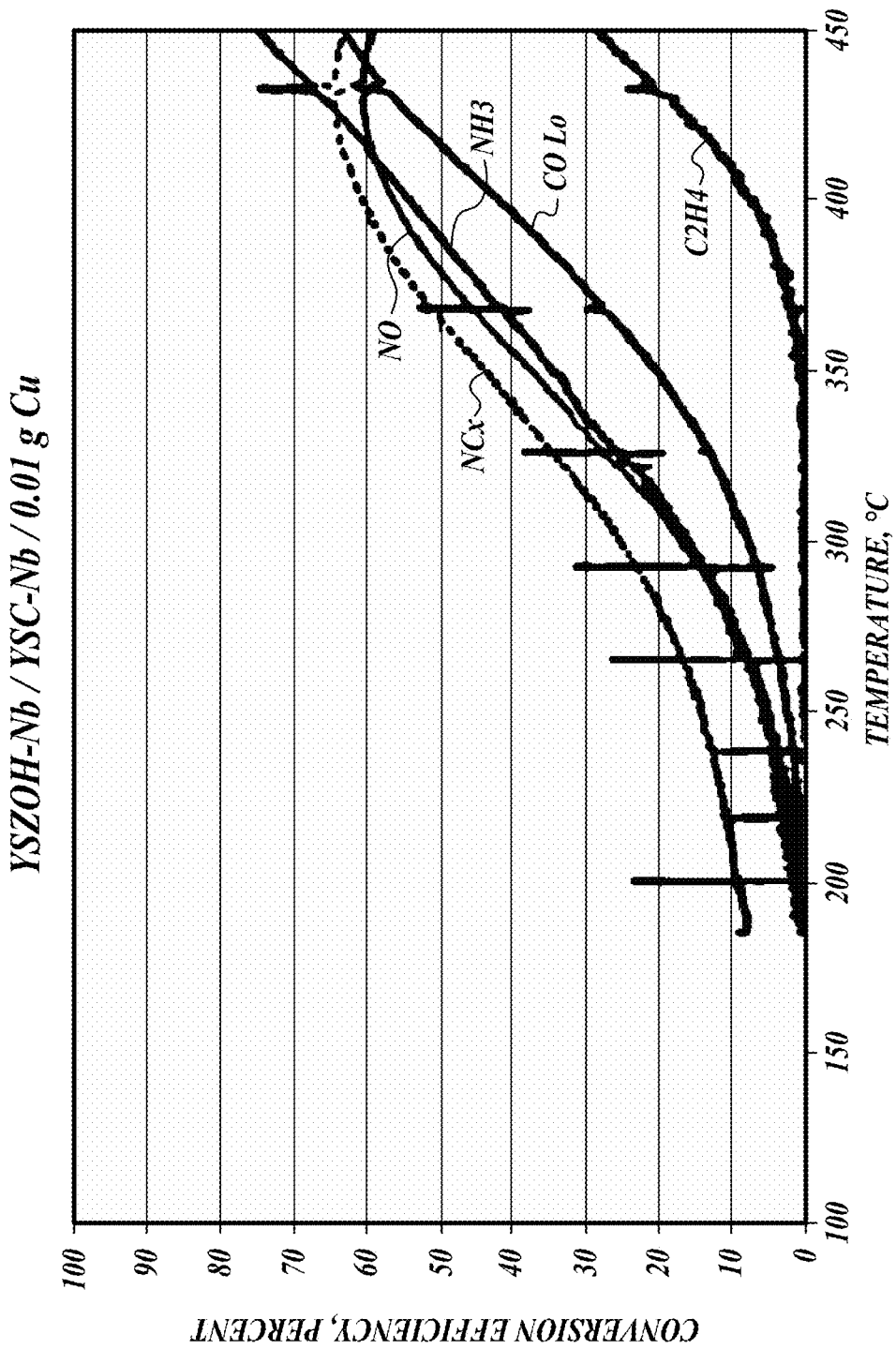
FIGS. 11A-11B is a graph of a conversion efficiency (11A) and a graph of gas emission composition (11B) of a Nb-surface-modified YSZ/YSC containing 0.01 g absolute amount of Cu.
Figure 11B:
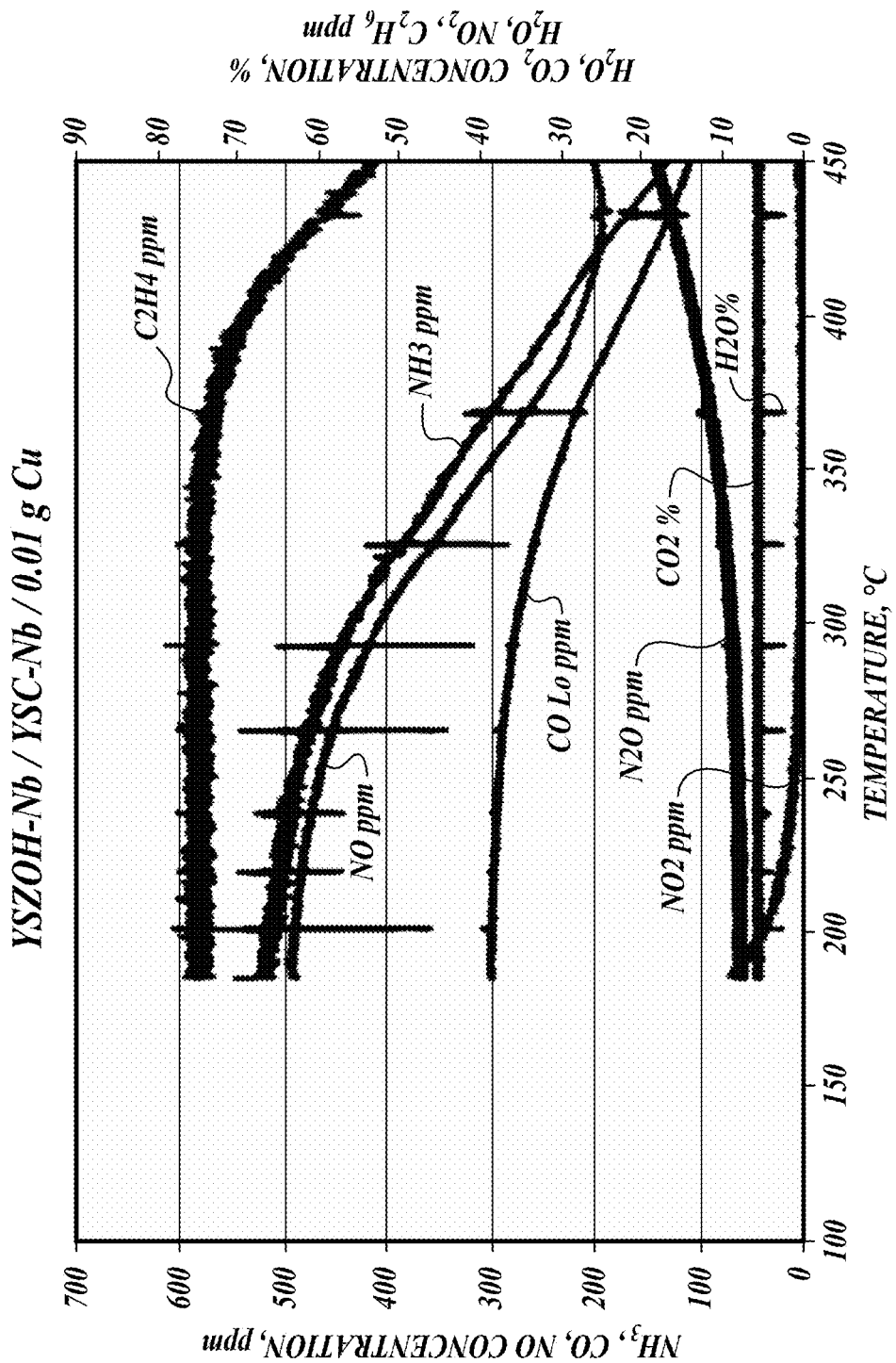
Figure 12A:
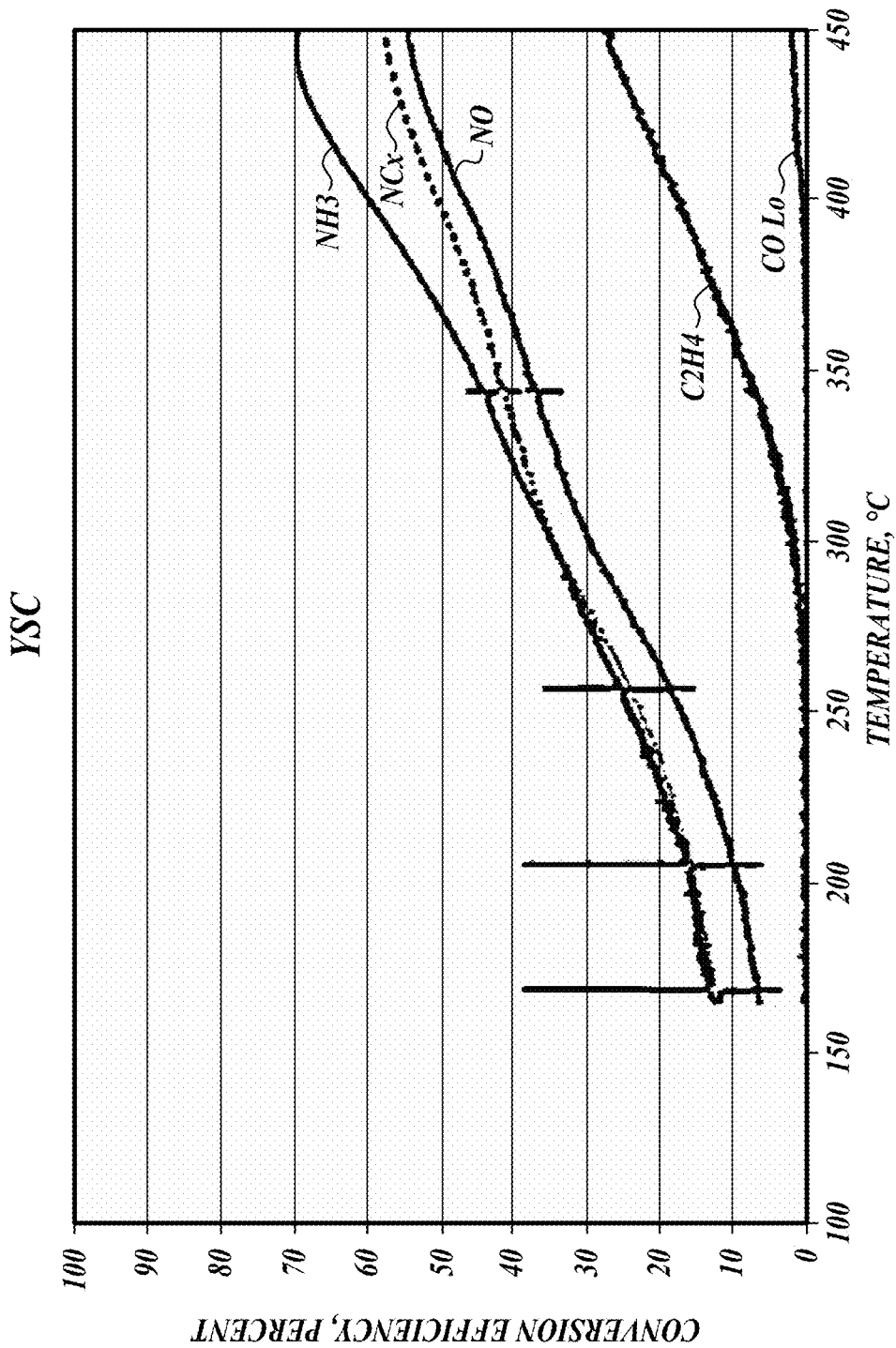
FIGS. 12A-12B is a graph of a conversion efficiency (12A) and a graph of gas emission composition (12B) of a surface-modified YSC-10.
Figure 12B:
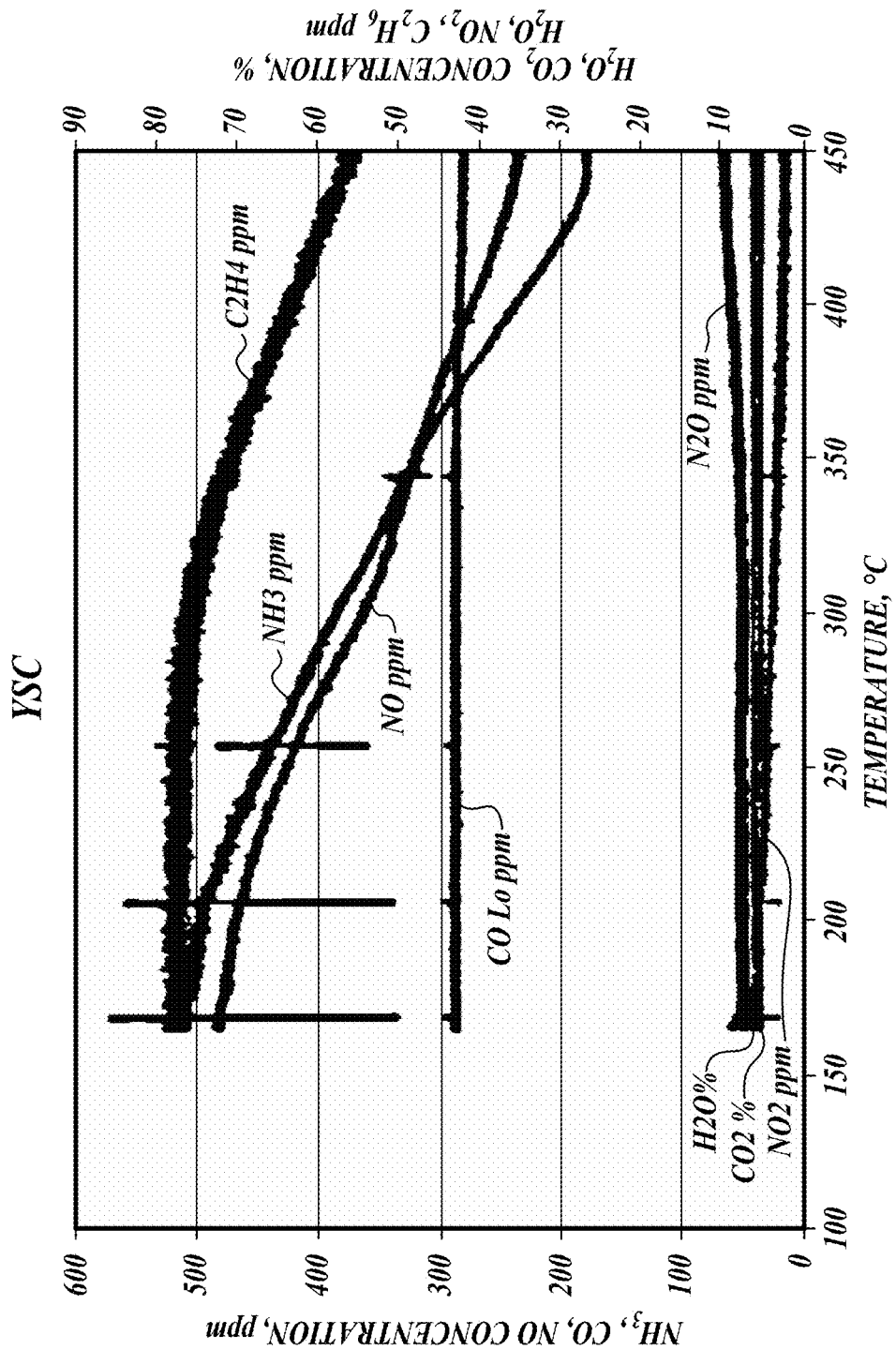
Figure 13A:
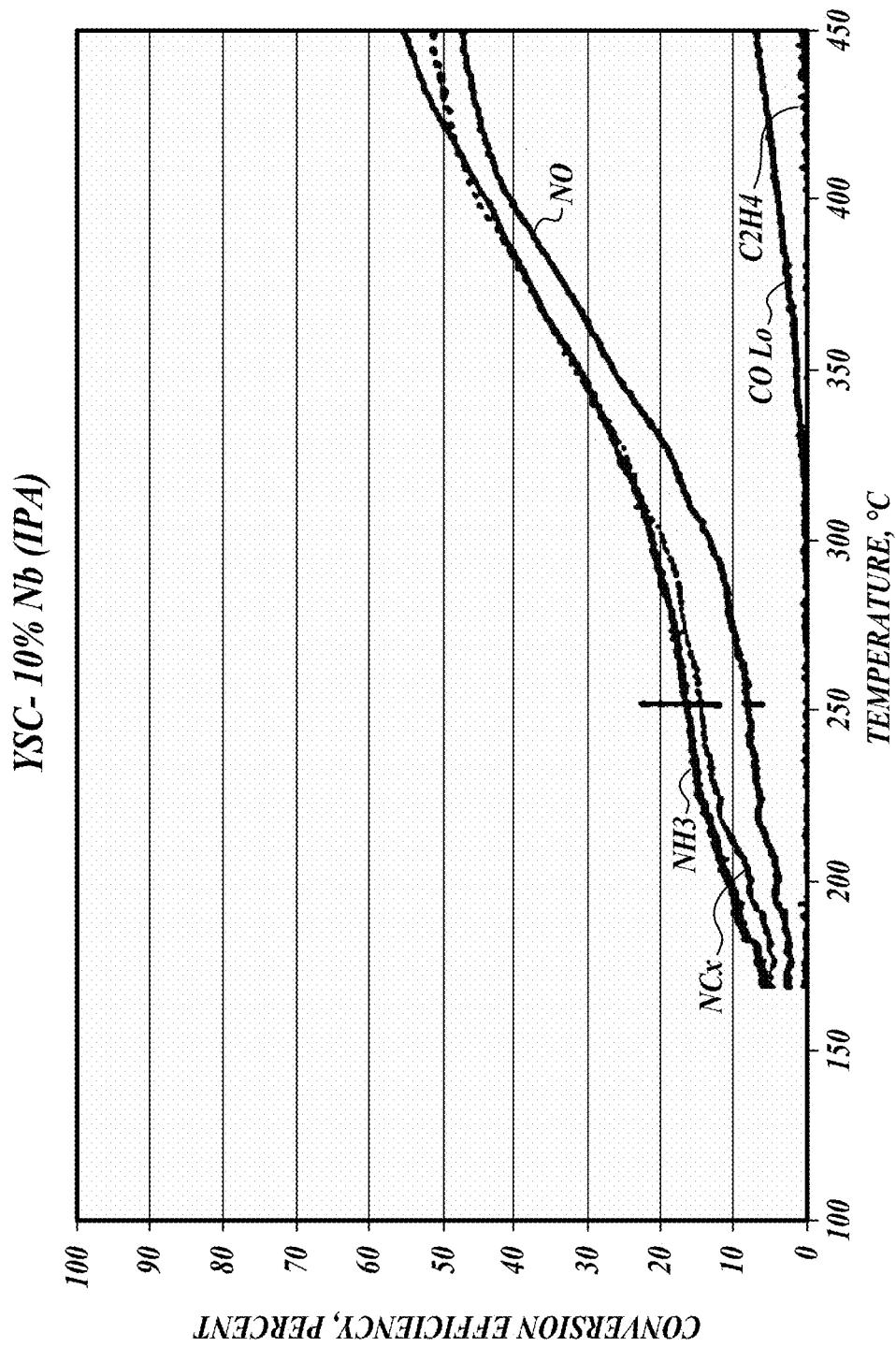
FIGS. 13A-13B is a graph of a conversion efficiency (13A) and a graph of gas emission composition (13B) of a Nb-surface-modified YSC-10 with 10% Nb.
Figure 13B:
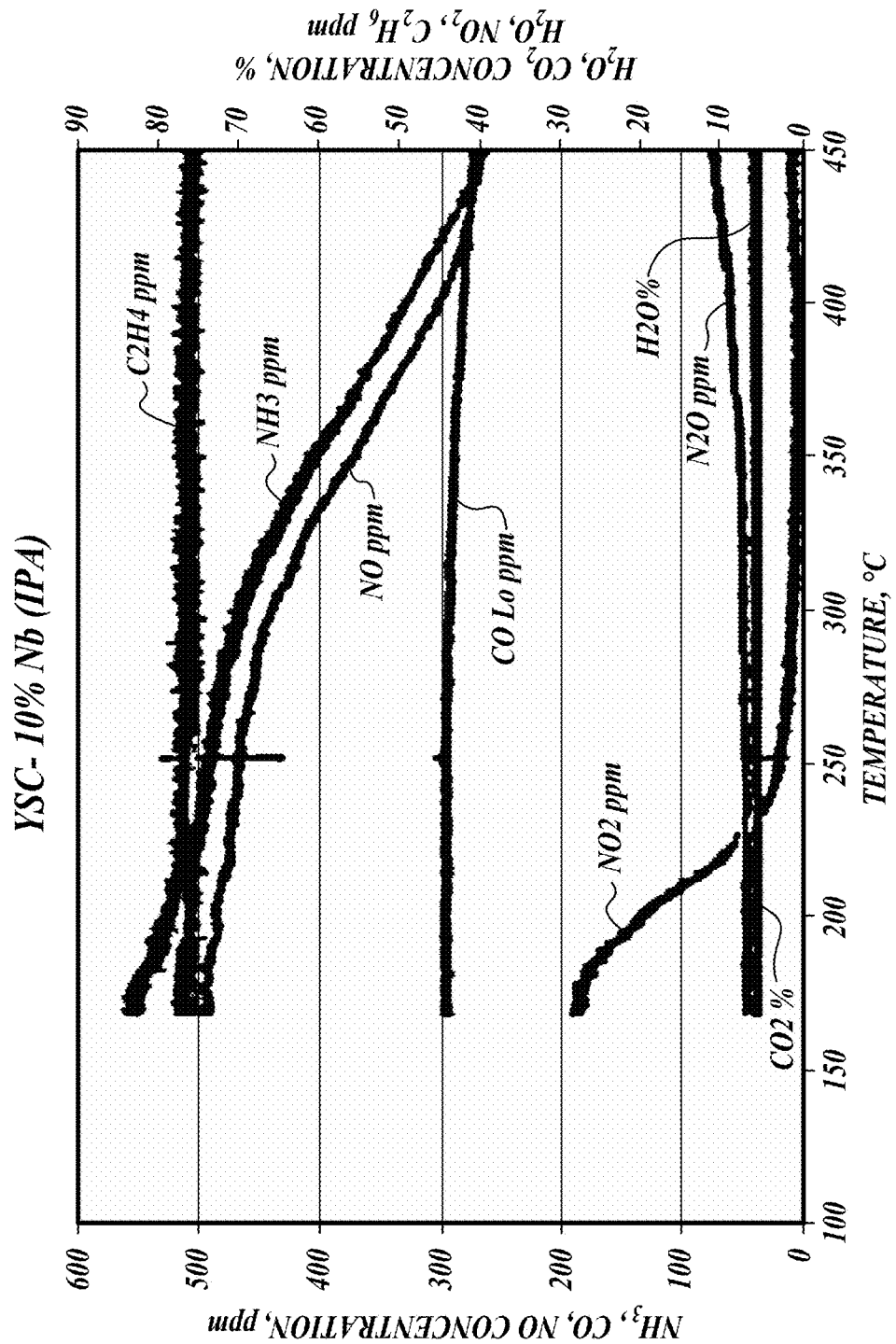

FIG. 5 is a low magnification SEM image of a $Nb_2O_5$ surface-modified SAPO-34. FIG. 6 is a high magnification SEM image of a $Nb_2O_5$ surface-modified SAPO-34. FIG. 7 is a high magnification SEM image of a $Nb_2O_5$ surface-modified SAPO-34.

Example 3 Simultaneous Washcoat Preparation and Surface Modification of Catalyst Precursors—Improved Washcoat Durability A washcoat slurry composition having the following components was made: 42.7% Poly (propylene glycol)-block-poly(ethylene glycol)-block-poly(propylene glycol); 2,500 Mn (Sigma-Aldrich), non-aqueous solvent, 0.9% polyethylene oxide; 300,000 Mv (Sigma-Aldrich), 21.4%

Results from Durability Test

Slurry #1—1.8% weight loss: PASS

Slurry #2—>50% weight loss: FAIL

Example 4. Modulation of Water Uptake and Improved Water Desorption

Core samples were prepared according to the water-based composition of Slurry #2 in Example 3, with appropriate changes to arrive at the compositions shown in Table 3.

The core samples were first treated for 3 hrs at 250° C. to remove all water adsorbed during storage under ambient conditions. Controlled water uptake was accomplished in a humidity chamber for 72 hrs at 25° C., 90% relative humidity. Weight loss was monitored under ambient conditions to determine desorption rate.

The core samples where all of the catalyst precursors were surface-modified with niobium pentoxide (in IPA), before washcoat preparation (i.e., items 2-4), exhibit both lower water uptake and faster desorption under ambient conditions than other samples shown in Table 3.

TABLE 3

Percentage of water uptake and rate of desorption for CuZSM-5 and redox metal oxide SCR catalyst under ambient conditions

| ITEM | WASHCOAT COMPOSITION | 0 | 1 hr | 2 hrs | 3 hrs | 4 hrs | 18 hrs |
|---|---|---|---|---|---|---|---|
| 1 | CuZSM; NbEtO; YSZOH, YSC | 4.2 | 2.34 | 2.28 | 2.26 | 2.45 | 2.23 |
| 2 | NbZSM (65° C.)/Cu; YSZOH-Nb; YSC-Nb | 2.32 | 0.73 | 0.73 | 0.73 | 0.71 | 0.69 |
| 3 | YSZOH-Nb; YSC-Nb | 2.37 | n/a | n/a | n/a | 0.83 | 0.83 |
| 4 | CuZSM/Nb (100° C.) | 3.93 | 2.02 | 1.98 | 1.96 | 1.98 | 1.96 |
| 5 | CuZSM; YSC; NYACOL | 4.35 | 2.68 | 2.65 | 2.65 | 2.65 | 2.65 |
| 6 | CuZSM/NYACOL | 4.31 | 2.6 | 2.48 | 2.48 | 2.6 | 2.46 |
| 7 | CuZSM/Nb (65° C.); YSC-Nb |  | 2.53 | 2.49 | 2.43 | 2.45 | 2.43 |

Presented in Table 4 is the relative water uptake for similarly surface-modified YSZ-8 redox metal oxide catalyst washcoat core samples with various surface modifying species that were achieved under different drying conditions, followed by calcining.

The results showed that the 10% niobium pentoxide modified YSZ-8 core that was prepared in pentanol at 200° C. (item 2), had the slowest initial water desorption rate but within 4 hrs was back to the equilibrated water content under ambient conditions. This contrasts with the other samples in this data set, particularly the sample with 10% titanium dioxide surface modification (Item 1). In the case of Item 1, within only 1 hr, over 83% of the water that had been taken up had been desorbed. However, the very rapid initial rate of desorption was not sustained, as the final water content after 4 hrs was substantially higher than that for Item 2.

One application for the YSZ-8% Nb (pentanol, 200° C.) material would be as a urea hydrolysis catalyst. Indeed, the data in Table IV indicated that a combination of niobium and titanium for surface modification of YSZ-10 catalyst precursor would yield a superior urea hydrolysis catalyst for the following reaction:

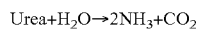

Urea+$H_2O \rightarrow 2NH_3+CO_2$

The % HMAr data from TGA that has been previously reported to identify preferred candidates for urea hydrolysis catalysts, has proven to be insufficiently sensitive when selecting from promising prospects (see FIGS. 8A and 8B). Therefore, the effluent gases released during the TGA procedure was directed to a FTIR instrument at (≥250° C.) for analysis. This data is presented in FIGS. 8A and 8B. The "peak release temperature" for $H_2O$ and $NH_3$ are shown (in FIGS. 8A and 8B respectively), indicating the temperature where the vast majority of the species is released from the urea solution to impact SCR function. The preferred catalyst is one that has the following combination of properties:
 (a) Low % HMAr byproduct levels—high molecular weight aromatic urea byproducts produced from urea solution thermal decomposition;
 (b) Good water storage capacity; and
 (c) A combination of low temperature and high intensity release of $NH_3$—necessary for low temperature dosing and rapid high uniformity of mixing of $NH_3$ with exhaust, before entering the SCR.

FIG. 8A shows the intensity and duration of water release as a function of temperature (which is increased at a rate of 10° C./min). The 50% urea exhibits a very surprising behav-

TABLE 4

Relative water uptake and rate of desorption for (YSZ-10) redox metal oxide with various surface modifications.

| Item | Washcoat Composition | Wt After 72 hrs @ 25° C., 90% RH | 1 hr | 2.5 hrs | 4 hrs | Equilibrated |
|---|---|---|---|---|---|---|
| 1 | YSZ - 10% Ti [Pentanol, 200° C.] | 3.44% | 0.61% | 0.38% | 0.38% | 0.13% |
| 2 | YSZ - 10% Nb [Pentanol, 200° C.] | 5.42% | 2.56% | 1.23% | 0.12% | 0.15% |
| 3 | YSZ - 5% Zr/5% Nb [Pentanol, 200° C.] | 4.30% | 1.10% | 0.61% | 0.50% | 0.44% |
| 4 | YSZ - 10% Nb (IPA, 100° C.) | 3.71% | 1.36% | 0.57% | 0.57% | 0.42% |

Example 5. High Efficiency Urea Hydrolysis Catalyst

Surface-modified catalyst precursors from Example 4 were evaluated as urea hydrolysis catalysts by thermogravimetric analysis/fourier transform infrared spectroscopy (TGA/FTIR) analysis, using a Thermo Scientific TGA 500 instrument. Using alumina TGA pans, and 50% urea solution the catalyst materials were heated at 10° C./min to a final temperature of 6000° C., and the change in weight as urea and urea biproducts decomposed were monitored. $N_2$ purge gas (flowing at 90 mL/min) was used as a carrier of gaseous products from said decomposition processes into the FTIR test cell for analysis.

Results from TGA/FTIR analysis are summarized in FIGS. 8A and 8B, and the following conclusions can be drawn:

ior, where water is released at medium intensity throughout the entire temperature range (room temperature to 600° C.). The fact that water is persistently held in the urea deposits at the highest temperatures tested is a reflection on the hygroscopic properties of the compounds that are contained in the deposits.

Without wishing to be bound by theory, it is believed that water retention could contribute negatively to meeting emissions standards under cold start conditions. This data has major implications concerning the relative efficiency of the evaporation step that conventional wisdom claims to precede thermal decomposition of urea. Rather, the data shows that total water evaporation is not completed even between 500-600° C.

All catalyst preparations, except sample C (TiO₂ control), exhibited water release at temperatures above 150° C.; with most ceasing to release water at temperatures approaching 400° C. This is based upon the water storage ability of the zirconia-based materials that served as the major component of the catalysts.

The zirconia-based catalyst dramatically contrast with sample C ($TiO_2$), which has poor wettability and hence is unable to retain water under these experimental conditions.

As shown in FIG. 8B, the data for 50% urea showed that release of $NH_3$ started at about 170° C. at very low intensity and continued at that level through 600° C.

Both catalysts A & F started to release $NH_3$ at medium intensity in the 150-200° C. range, showing peak intensities for release of $NH_3$ at 234 and 218° C., respectively. Ammonia continued to be released from these catalysts at low to medium levels up to about 400° C.

While the $TiO_2$ sample C started to release $NH_3$ at moderate intensity as low as the 150-200° C. range, it was not until a temperature of about 255° C. that high intensity release of $NH_3$ actually occurred; after which there was no further release of $NH_3$. This was a good indication that the $TiO_2$ has desirable properties to serve as a hydrolysis catalyst. However, its ability to function effectively under a range of operating conditions may be limited by the poor wettability and related water storage challenge discussed in FIG. 8A.

It is evident from the data for $H_2O$ and $NH_3$ release behavior for catalyst sample D the process for surface modification of the present disclosure has successfully created a catalyst with intermediate properties between $TiO_2$ (sample C) and YSZ-8 (sample A).

Catalyst samples B and E exhibited the most desirable properties to serve as high performance hydrolysis catalysts in the in heavy duty diesel (HDD) truck applications. These two samples met the three criteria previously defined for a preferred urea hydrolysis catalyst, and exhibited a high intensity $NH_3$ release at low temperatures of 223 and 218° C., respectively. Indeed, catalyst sample E in FIGS. 8A and 8B was particularly promising because a persistent burst of high intensity $NH_3$ was released over the temperature range of about 150-300° C. By way of reference, the melting point of urea is 144° C., which marked the lower temperature at which thermolysis may commence from a thermodynamic viewpoint. However, the kinetics of such a reaction demanded much higher temperatures. The fact that catalyst E is able to exhibit $NH_3$ at temperatures approaching the melting point of urea was unexpected.

Example 6. Improved NRE Employing Surface-Modified Catalyst Precursor Technologies Mixed redox metal oxide catalyst (1"×1") cordierite core samples were prepared from washcoat composition containing 80% YSZ-8 and 20% YSC-10 where each precursor had been surface-modified with 10% niobium pentoxide prior to preparing the washcoat.

The washcoat was dip coated onto a cordierite (5/300) substrate (available from NGK Automotive Ceramics, U.S.A., Inc.), in the form of 1"×1" core samples at 30° C., with a vacuum applied to pull excess washcoat through the channel and assist in drying. The core samples were dried at 105° C. in air and calcined at 450° C. for 1 hr.

Selected core samples of the same washcoat composition were further modified in a dilute solution of nickel chloride or copper sulfate, then dried and calcined once again:

These core samples were then tested for NRE according to the reverse lightoff SCR (NO-free) protocol with the following gas stream composition: 600 ppm NO; 600 ppm $NH_3$; 75 ppm $C_2H_4$; 300 ppm CO; 10% $O_2$; 5.6% $CO_2$; 6% $H_2O$; balance $N_2$; and 40,000 GHSV.

Post-fabrication treatment of selected core samples with different amounts of either Cu or Ni salts, followed by calcining gave results shown in FIGS. 9A, 9B, 10A, 10B, 11A, and 11B Example 7. Oxidative Power Modulation of Redox Metal Oxides for Simultaneous SRC and SCO The oxidative power of ceria-based catalysts can in some instances be harmful to other catalyst components (e.g., Cu-zeolites) for use in significant amounts. By surface-modifying ceria-based catalysts, the oxidative power can be modulated so that the SCO properties may be fully exploited to provide high efficiency and durability SCR catalysts.

YSC-10/10% Nb catalyst precursor (from Example #1) was compared with unmodified YSC-10 in washcoat applied to (1"×1") cordierite core samples, and tested for NRE by the reverse lightoff SCR procedure (Example 6). Results are shown in FIGS. 12A, 12B, 13A, and 13B.

The results showed that the surface-modified yttria catalyst substantially retained its overall good NRE, while showing a dramatic suppressed hydrocarbon (HC) (i.e., ethylene) oxidation, while CO oxidation was little changed from the already low level. The ability to oxidize $NH_3N_2O$ was essentially unaffected by the surface modification.

While illustrative embodiments have been illustrated and described, it will be appreciated that various changes can be made therein without departing from the spirit and scope of the invention.

The invention claimed is:

1. A method of making an engine aftertreatment catalyst, comprising:
   providing a solution comprising an organic solvent and an organometallic compound selected from a metal alkoxide, a metal carboxylate, a metal acetylacetonate, a metal organic acid ester, and a combination thereof;
   mixing the solution with a metal oxide, a metal zeolite, or both a metal oxide and a metal zeolite to provide a mixture, immediately followed by drying the mixture to remove the organic solvent;
   calcining the mixture to provide a surface-modified metal oxide catalyst; and
   incorporating the surface-modified metal oxide catalyst into an engine aftertreatment system.

2. The method of claim 1, wherein the organometallic compound is sparingly soluble in water, insoluble in water, or decomposes in water.

3. The method of claim 1, wherein the organometallic compound comprises an element selected from Nb, Ca, Sc, Ta, Ti, V, Cr, Mn, Mo, Al, Si, Ge, Ir, Os, Fe, Co, Ni, Cu, Y, Zr, Ru, Rh, Pd, Pt, Ag, Ba, W, La, Re, Ce, Re, Sr, and any combination thereof.

4. The method of claim 1, wherein the metal alkoxide is selected from titanium (IV) ethoxide, titanium (IV) isopropoxide, titanium (IV) butoxide, barium (II) t-butoxide, yttrium (III) 2-methoxyethoxide, niobium (III) chloride 1,2-dimethoxyethane, $Re_4O_{6-y}(OCH_3)_{12+y}$, $Re_{4-x}Mo_xO_{6-y}(OCH_3)_{12+y}$, $Re_{4-x}W_xO_{6-y}(OCH_3)_{12+y}$, titanium isopropoxide, titanium ethoxide, zirconium ethoxide, tetraethyl orthosilicate, aluminium isopropoxide, niobium ethoxide, tantalum ethoxide, potassium tert-butoxide, $[CrAl(OPr^j)_4]_3$, $Mn[Al(OPr^j)_4]_2$, $[Fe\{Al(OPr^j)_4\}_{2or3}]$, $Co[Al(OPr^j)_4]_2$, $Ni[Al(OPr^j)_4]_2$, $Ni[Ga(OPr^j)_4]_2$, $Ni[Nb(OPr^j)_6]_2$, $[Ni[Ta[O-Pr^j]_6]_2$, $Ni[Zr_2(OPr^j)_9]_2$, and $Cu[Al(OPr^j)_4]_2$.

5. The method of claim 1, wherein the metal alkoxide is niobium ethoxide.

6. The method of claim 1, wherein the metal carboxylate is selected from zirconium propionate, zirconium acetatopropionate; $Zr(acac)_4$; dicalcium barium propionate, $Ca_2Ba(C_2H_5COO)_6$; $Zr(CH_3CH_2COO)_4$; lanthanum propionate.

7. The method of claim 1, wherein the metal carboxylate is a metal ethyl diamine or metal phthalimide, where the metal is selected from Zr, Ba, Ti, La, Sr, Ce, and Nb.

8. The method of claim 1, wherein the metal acetylacetonate is selected from titanium diisopropoxide bis(acetylacetonate) $(CH_3)_2CHO]_2Ti(C_5H_7O_2)_2)$; zirconium (IV) acetylacetonate; $Zr(C_5H_7O_2)_4$; palladium(II) acetylacetonate, $C_{10}H_{14}O_4Pd$; platinum(II) acetylacetonate, $Pt(C_5H_7O)_2$; titanium bis(acetylacetonate)dichloride; vanadyl acetylacetonate; chromium acetylacetonate; manganese(III) acetylacetonate; iron acetylacetonates; ruthenium acetylacetonates; cobalt acetylacetonates; iridium acetylacetonates; nickel(II) acetylacetonate; copper acetylacetonate; and zinc acetylacetonate.

9. The method of claim 1, wherein the solution further comprises a low molecular weight polymer selected from poly(propylene glycol), poly(ethylene glycol), and copolymers thereof.

10. The method of claim 1, wherein the solvent is selected from alcohols, ethers, and esters.

11. The method of claim 1, wherein the mixture further comprises water.

12. The method of claim 1, wherein the metal oxide is selected from cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, and any combination thereof.

13. The method of claim 1, wherein the metal oxide is selected from titanium oxide, zirconium oxide, cerium oxide, and any combination thereof.

14. The method of claim 1, wherein the metal oxide further comprises a cationic dopant.

15. The method of claim 14, wherein the cationic dopant selected from $sr^{2+}$, $Ru^{4+}$, $Rh^{3+}$, $Mg^{2+}$, $Cu^{2+}$, $Cu^{3+}$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, and $Nb^{5+}$.

16. The method of claim 14, wherein the cationic dopant is selected from $Y^{3+}$, $Sc^{3+}$, and $Ca^{2+}$.

17. The method of claim 16, wherein the metal oxide is selected from yttria-stabilized zirconia, yttria-stabilized ceria, and a combination thereof.

18. The method of claim 1, wherein the metal zeolite is selected from Fe-doped aluminosilicate zeolites, Cu-doped aluminosilicate zeolites, Fe and Cu-doped aluminosilicate zeolites, Fe-doped silico-alumino-phosphate zeolites, Cu-doped silico-alumino-phosphate zeolites, and Fe and Cu-doped silico-alumino-phosphate zeolites.

19. The method of claim 1, further comprising exposing the surface-modified metal oxide catalyst to a solution comprising nickel ions, copper ions, or a combination thereof.

20. The method of claim 19, further comprising calcining the surface-modified metal oxide catalyst after exposing the surface-modified metal oxide catalyst to a solution comprising nickel ions, copper ions, or a combination thereof.

21. The method of claim 1, wherein mixing comprises milling.

22. The method of claim 1, wherein drying comprises air drying.

23. The method of claim 1, wherein drying comprises heating at a temperature of from 20° C. to 110° C.

24. The method of claim 1, wherein calcining comprises heating the mixture to a temperature of about 450° C. to 550° C. for a duration of from 1 to 2 hours.

25. The method of claim 1, wherein the surface-modified metal oxide catalyst comprises a reduced metal coating on a metal oxide surface.

26. The method of claim 1, wherein the surface-modified metal oxide catalyst provides greater urea hydrolysis efficiency compared to a metal oxide without surface modification.

27. The method of claim 1, wherein the surface-modified metal oxide catalyst has a greater $NO_x$ reduction efficiency compared to a metal oxide without surface modification.

28. The method of claim 1, wherein the surface-modified metal oxide catalyst has increased durability compared to a metal oxide without surface modification.

* * * * *